United States Patent
Wallentin et al.

(10) Patent No.: US 12,556,986 B2
(45) Date of Patent: Feb. 17, 2026

(54) USER EQUIPMENT, SOURCE ACCESS NODE AND METHODS IN A WIRELESS COMMUNICATIONS NETWORK

(71) Applicant: Telefonaktiebolaget LM Ericsson (publ), Stockholm (SE)

(72) Inventors: Pontus Wallentin, Linköping (SE); Johan Rune, Lidingö (SE); Oscar Ohlsson, Bromma (SE); Claes-Göran Persson, Mjölby (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 877 days.

(21) Appl. No.: 17/635,353

(22) PCT Filed: Jun. 29, 2020

(86) PCT No.: PCT/SE2020/050676
§ 371 (c)(1),
(2) Date: Feb. 14, 2022

(87) PCT Pub. No.: WO2021/029801
PCT Pub. Date: Feb. 18, 2021

(65) Prior Publication Data
US 2022/0279401 A1    Sep. 1, 2022

Related U.S. Application Data

(60) Provisional application No. 62/887,010, filed on Aug. 15, 2019.

(51) Int. Cl.
*H04W 36/00* (2009.01)
*H04W 76/15* (2018.01)
(Continued)

(52) U.S. Cl.
CPC ....... *H04W 36/0079* (2018.08); *H04W 76/30* (2018.02); *H04W 36/185* (2023.05)

(58) Field of Classification Search
CPC .......... H04W 36/0079; H04W 36/185; H04W 76/30
See application file for complete search history.

(56) References Cited

U.S. PATENT DOCUMENTS

2009/0238142 A1 *  9/2009  Chun ................... H04W 28/06
                                                    370/329
2015/0350962 A1 * 12/2015  Futaki ............. H04W 36/00692
                                                    370/331
(Continued)

FOREIGN PATENT DOCUMENTS

CN        107690162 A  *  2/2018   ........ H04W 36/0005
WO     WO 2020/167209 A1    8/2020

OTHER PUBLICATIONS

Oppo, R2-1900863, 'Discussion on failure handling of handover for NR mobility', 3GPP TSG-RAN WG2 Meeting #105, Feb. 25-Mar. 1, 2019, pp. 1-4. (Year: 2019).*

(Continued)

*Primary Examiner* — Melvin C Marcelo
(74) *Attorney, Agent, or Firm* — Weisberg I.P. Law, P.A.

(57) ABSTRACT

A method performed by a User Equipment, UE, for handling a source radio link during a handover from a source access node to a target access node in a wireless communications network. The UE is triggered to perform the handover. The UE establishes Radio Link Control, RLC, entities and associated target radio link with the target access node, while keeping RLC entities and associated source radio link with the source access node. The UE checks whether a source radio link related failure has occurred. When a source radio link related failure has occurred, the UE checks the radio link related failure against a set of source radio link release UE criteria, and when one or more source radio link release (Continued)

UE criterion is fulfilled out of the set of source radio link release UE criteria, the UE handling the source radio link according to a predetermined rule.

20 Claims, 14 Drawing Sheets

(51) Int. Cl.
  *H04W 76/18* (2018.01)
  *H04W 76/19* (2018.01)
  *H04W 76/30* (2018.01)
  *H04W 36/18* (2009.01)

(56) References Cited

U.S. PATENT DOCUMENTS

| | | | |
|---|---|---|---|
| 2018/0098250 A1 | 4/2018 | Vrzic et al. | |
| 2019/0082363 A1 | 3/2019 | Park et al. | |
| 2020/0314716 A1* | 10/2020 | Kim | H04W 36/0079 |
| 2022/0053394 A1* | 2/2022 | Kim | H04W 36/0058 |

OTHER PUBLICATIONS

Vivo, R2-1912349, 'Summary of Email Discussion on CP for DAPS', 3GPP TSG-RAN WG2 Meeting #107bis, Oct. 14-18, 2019, pp. 1-37. (Year: 2019).*

International Search Report and Written Opinion of the International Searching Authority, PCT/SE2020/050676, mailed Sep. 18, 2020, 16 pages.

Qualcom Incorporated, "LTE mobility enhancements for eMBB HO using dual active protocol stack," 3GPP TSG-RAN WG2 Meeting #106, R2-1906378, Reno, NV, USA, May 13-17, 2019, Agenda item: 12.3.2.1, (XP051729843) 10 pages.

Xiaomi, "RLM and RRM in eMBB," 3GPP TSG-RAN WG2, Meeting #106, R2-19006240, Reno, NV, USA, May 13-17, 2019, Agenda Item 12.3.2.1, (XP051729710) 2 pages.

Vivo, "Summary of Email Discussion on CP for DAPS", 3GPP TSG-RAN WG2, Meeting #107bis, Chongqing, China, Oct. 14-18, 2019, R2-1912349, Agenda Item 7.3.2.2.1, (XP051804428) 37 pages.

3rd Generation Partnership Project; Technical Specification Group Radio Access Network; Evolved Universal Terrestrial Radio Access (E-UTRA); Study on latency reduction techniques for LTE (Release 14) 3GPP TR 36.881 V1.0.0 (May 2016), 99 pages.

3rd Generation Partnership Project; Technical Specification Group Radio Access Network; NR; Medium Access Control (MAC) protocol specification (Release 15) 3GPP TS 38.321 V15.6.0 (Jun. 2019) 78 pages.

3rd Generation Partnership Project; Technical Specification Group Radio Access Network; Evolved Universal Terrestrial Radio Access (E-UTRA); Requirements for support of radio resource management (Release 16) 3GPP TS 36.133 V16.2.0 (Jun. 2019), 86 pages.

3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 14) 3GPP TS 36.300 V14.10.0 (Jun. 2019), 332 pages.

3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 15) 3GPP TS 36.300 V15.6.0 (Jun. 2019), 365 pages.

3rd Generation Partnership Project; Technical Specification Group Radio Access Network; Evolved Universal Terrestrial Radio Access (E-UTRA); Medium Access Control (MAC) protocol specification (Release 15), 3GPP TS 36.321 V15.6.0 (Jun. 2019) 133 pages.

3rd Generation Partnership Project; Technical Specification Group Radio Access Network; Evolved Universal Terrestrial Radio Access (E-UTRA); Radio Resource Control (RRC); Protocol specification (Release 14) 3GPP TS 36.331 V14.11.0 (Jun. 2019), 782 pages.

* cited by examiner

USER EQUIPMENT, SOURCE ACCESS NODE AND METHODS IN A WIRELESS COMMUNICATIONS NETWORK

CROSS REFERENCE TO RELATED APPLICATIONS

This application is a 35 U.S.C. § 371 national stage application of PCT International Application No. PCT/SE2020/050676 filed on Jun. 29, 2020, which in turn claims domestic priority to U.S. Provisional Patent Application No. 62/887,010, filed on Aug. 15, 2019, the disclosures and content of which are incorporated by reference herein in their entirety.

TECHNICAL FIELD

Embodiments herein relate to a core network node, a User Equipment (UE), a source network node and methods therein. In some aspects, they relate to handling a source radio link during a handover of a UE from the source access node to a target access node in a wireless communications network.

BACKGROUND

In a typical wireless communication network, wireless devices, also known as wireless communication devices, mobile stations, stations (STA) and/or User Equipments (UE), communicate via a Local Area Network such as a W-Fi network or a Radio Access Network (RAN) to one or more core networks (CN). The RAN covers a geographical area which is divided into service areas or cell areas, which may also be referred to as a beam or a beam group, with each service area or cell area being served by a radio access node such as a radio access node e.g., a Wi-Fi access point or a radio base station (RBS), which in some networks may also be denoted, for example, a NodeB, eNodeB (eNB), or gNB as denoted in 5G. A service area or cell area is a geographical area where radio coverage is provided by the radio access node. The radio access node communicates over an air interface operating on radio frequencies with the wireless device within range of the radio access node.

Specifications for the Evolved Packet System (EPS), also called a Fourth Generation (4G) network, have been completed within the 3rd Generation Partnership Project (3GPP) and this work continues in the coming 3GPP releases, for example to specify a Fifth Generation (5G) network also referred to as 5G New Radio (NR). The EPS comprises the Evolved Universal Terrestrial Radio Access Network (E-UTRAN), also known as the Long Term Evolution (LTE) radio access network, and the Evolved Packet Core (EPC), also known as System Architecture Evolution (SAE) core network. E-UTRAN/LTE is a variant of a 3GPP radio access network wherein the radio access nodes are directly connected to the EPC core network rather than to RNCs used in 3G networks. In general, in E-UTRAN/LTE the functions of a 3G RNC are distributed between the radio access nodes, e.g. eNodeBs in LTE, and the core network. As such, the RAN of an EPS has an essentially "flat" architecture comprising radio access nodes connected directly to one or more core networks, i.e. they are not connected to RNCs. To compensate for that, the E-UTRAN specification defines a direct interface between the radio access nodes, this interface being denoted the X2 interface.

Multi-antenna techniques can significantly increase the data rates and reliability of a wireless communication system. The performance is in particular improved if both the transmitter and the receiver are equipped with multiple antennas, which results in a Multiple-Input Multiple-Output (MIMO) communication channel. Such systems and/or related techniques are commonly referred to as MIMO.

Wireless Communication Systems in 3GPP

FIG. 1 illustrates a simplified wireless communication system. Consider the simplified wireless communication system in FIG. 1, with a UE 12, which communicates with one or multiple access nodes 103-104, which in turn is connected to a network node 106. The access nodes 103-104 are part of the radio access network 10.

For wireless communication systems pursuant to 3GPP Evolved Packet System, (EPS), also referred to as Long Term Evolution, LTE, or 4G, standard specifications, such as specified in 3GPP TS 36.300 v15.6.0 and related specifications, the access nodes 103-104 corresponds typically to a Evolved NodeBs (eNBs) and the network node 106 corresponds typically to either a Mobility Management Entity (MME) and/or a Serving Gateway (SGVV). The eNB is part of the radio access network 10, which in this case is the E-UTRAN (Evolved Universal Terrestrial Radio Access Network), while the MME and SGW are both part of the EPC (Evolved Packet Core network). The eNBs are inter-connected via the X2 interface, and connected to EPC via the S1 interface, more specifically via S1-C to the MME and S1-U to the SGW.

For wireless communication systems pursuant to 3GPP 5G System, 5GS (also referred to as New Radio, NR, or 5G) standard specifications, such as specified in 3GPP TS 38.300 v15.6.0 and related specifications, on the other hand, the access nodes 103-104 corresponds typically to an 5G NodeB (gNB) and the network node 106 corresponds typically to either a Access and Mobility Management Function (AMF) and/or a User Plane Function (UPF). The gNB is part of the radio access network 10, which in this case is the NG-RAN (Next Generation Radio Access Network), while the AMF and UPF are both part of the 5G Core Network (5GC). The gNBs are inter-connected via the Xn interface, and connected to 5GC via the NG interface, more specifically via NG-C to the AMF and NG-U to the UPF.

To support fast mobility between NR and LTE and avoid change of core network, LTE eNBs can also be connected to the 5G-CN via NG-U/NG-C and support the Xn interface. An eNB connected to 5GC is called a next generation eNB (ng-eNB) and is considered part of the NG-RAN. LTE connected to 5GC will not be discussed further in this document; however, it should be noted that most of the solutions/features described for LTE and NR in this document also apply to LTE connected to 5GC. In this document, when the term LTE is used without further specification it refers to LTE-EPC.

Mobility in RRC_CONNECTED in LTE and NR

Mobility in RRC_CONNECTED state is also known as handover. The purpose of handover is to move the UE, due to e.g. mobility, from a source access node using a source radio connection (also known as source cell connection or source radio link), to a target access node, using a target radio connection (also known as target cell connection). The source radio connection is associated with a source cell controlled by the source access node. The target radio connection is associated with a target cell controlled by the target access node. So in other words, during a handover, the UE moves from the source cell to a target cell. Sometimes the source access node or the source cell is referred to as the "source", and the target access node or the target cell is sometimes referred to as the "target".

In some cases, the source access node and target access node are different nodes, such as different eNBs or gNBs. These cases are also referred to as inter-node handover, inter-eNB handover or inter-gNB handover. In other cases, the source access node and target access node are the same node, such as the same eNB and gNB. These cases are also referred to as intra-node handover, intra-eNB handover or intra-gNB handover, and covers the case then source and target cells are controlled by the same access node. In yet other cases, handover is performed within the same cell (and thus also within the same access node controlling that cell)—these cases are also referred to as intra-cell handover.

It should therefore be understood that the source access node and target access node refers to a role served by a given access node during a handover of a specific UE. For example, a given access node may serve as source access node during handover of one UE, while it also serves as the target access node during handover of a different UE. And, in case of an intra-node or intra-cell handover of a given UE, the same access node serves both as the source access node and target access node for that UE.

An RRC_CONNECTED UE in E-UTRAN or NG-RAN can be configured by the network to perform measurements of serving and neighbor cells and based on the measurement reports sent by the UE, the network may decide to perform a handover of the UE to a neighbor cell. The network then sends a Handover Command message to the UE (in LTE an RRConnectionReconfiguration message with a field called mobilityControlInfo and in NR an RRCReconfiguration message with a reconfigurationWithSync field).

These reconfigurations are actually prepared by the target access node upon a request from the source access node (over X2 or S1 interface in case of EUTRA-EPC or Xn or NG interface in case of NG-RAN-5GC) and takes into account the existing RRC configuration and UE capabilities as provided in the request from the source access node and its own capabilities and resource situation in the intended target cell and target access node. The reconfiguration parameters provided by the target access node contains, for example, information needed by the UE to access the target access node, e.g., random access configuration, a new C-RNTI assigned by the target access node and security parameters enabling the UE to calculate new security keys associated to the target access node so the UE can send a Handover Complete message (in LTE an RRConnectionReconfiguratioComplete message and in NR an RRCReconfigurationComplete message) on SRB1 encrypted and integrity protected based on new security keys upon accessing the target access node.

FIG. 2 depicts a Handover in LTE summarizes the signaling flow between UE, source access node, also known as source gNB, source eNB or source cell, and target access node, also known as target gNB, target eNB or target cell, during a handover procedure, using LTE as example.

Step 1: The UE sends a measurement report to the source eNB.
User data is transferred between the UE and the SGW.
Step 2: The source eNB determines a Handover (HO) decision.
Step 3: The source eNB sends a HO request to the target eNB.
Step 4: The target eNB sends a HO request ACK to the source eNB.
Step 5: The source eNB sends an RRC connection reconfiguration to the UE.
Step 6: The UE detaches from source cell.
Step 7: The source eNB sends an SN status transfer to the target eNB.
The source eNB performs data forwarding to the target eNB.
Step 8: The UE performs a Random access procedures to the target eNB.
Step 9: The UE sends an RRC connection reconfiguration complete to the target eNB.
User data is transferred between the UE and the target eNB.
Step 10: The target eNB sends a Path Switch Request to the MME.
Step 11: Path switch related signaling is transferred between the MME and SGW.
User data is transferred between the target eNB and the SGW.
The SGW sends an End Marker to the target eNB via the source eNB.
Step 12: The target eNB sends a Path Switch Request ACK to the MME.

User Plane Handling During Handover

Depending on the required QoS, either a seamless or a lossless handover is performed as appropriate for each user plane radio bearer, as explained in the following subsections.

Seamless Handover

Seamless handover is applied for user plane radio bearers mapped on Link Control (RLC) Unacknowledged Mode (UM). These types of data are typically reasonably tolerant of losses but less tolerant of delay (e.g. voice services). Seamless handover is therefore designed to minimize complexity and delay but may result in loss of some Packet Data Convergence Protocol (PDCP) Service Data Units (SDUs). At handover, for radio bearers to which seamless handover applies, the PDCP entities including the header compression contexts are reset, and the COUNT values are set to zero. As a new key is anyway generated at handover, there is no security reason to maintain the COUNT values. PDCP SDUs in the UE for which the transmission has not yet started will be transmitted after handover to the target access node. In the source access node, PDCP SDUs that have not yet been transmitted can be forwarded via the X2/Xn interface to the target access node. PDCP SDUs for which the transmission has already started but that have not been successfully received will be lost. This minimizes the complexity because no context (i.e. configuration information) has to be transferred between the source access node and the target access node at handover.

Lossless Handover

Based on the SN that is added to PDCP Data PDUs it is possible to ensure in-sequence delivery during handover, and even provide a fully lossless handover functionality, performing retransmission of PDCP SDUs for which reception has not yet been acknowledged prior to the handover. This lossless handover function is used mainly for delay-tolerant services such as file downloads where the loss of one PDCP SDU can result in a drastic reduction in the data rate due to the reaction of the Transmission Control Protocol (TCP).

Lossless handover is applied for user plane radio bearers that are mapped on RLC Acknowledged Mode (AM). When RLC AM is used, PDCP SDUs that have been transmitted but not yet been acknowledged by the RLC layer are stored in a retransmission buffer in the PDCP layer.

In order to ensure lossless handover in the downlink (DL), the source access node forwards the DL PDCP SDUs stored in the retransmission buffer as well as fresh DL PDCP SDUs received from the gateway to the target access node for (re-)transmission. The source access node receives an indication from the gateway that indicates the last packet sent to the source access node (a so called "end marker" packet). The source access node also forwards this indication to the target access node 104 so that the target access node knows when it can start transmission of packets received from the gateway.

In order to ensure lossless handover in the uplink (UL), the UE retransmits the UL PDPC SDUs that are stored in the PDCP retransmission buffer. The retransmission is triggered by the PDCP re-establishment that is performed upon reception of the handover command. The source access node, after decryption and decompression, will forward all PDCP SDUs received out of sequence to the target access node. Thus, the target access node 104 can reorder the PDCP SDUs received from the source access node 111 and the retransmitted PDCP SDUs received from the UE based on the PDCP SNs which are maintained during the handover, and deliver them to the gateway in the correct sequence.

An additional feature of lossless handover is so-called selective re-transmission. In some cases it may happen that a PDCP SDU has been successfully received, but a corresponding RLC acknowledgement has not. In this case, after the handover, there may be unnecessary retransmissions initiated by the UE or the target access node based on the incorrect status received from the RLC layer. In order to avoid these unnecessary retransmissions a PDCP status report can be sent from the target access node to the UE and from the UE to the target access node. Whether to send a PDCP status report after handover is configured independently for each radio bearer and for each direction.

3GPP Release-14 Make-Before-Break Handover Handover interruption time is typically defined as the time from the UE stops transmission/reception with the source access node until the target access node resumes transmission/reception with the UE. over is configured independently for each radio bearer and for each direction.

In LTE pre-Release-14, according to 3GPP TR 36.881 v1.0.0, the handover interruption time is at least 45 ms. In LTE and NR, different solutions to decrease the handover interruption time have since then been discussed. Improvements are driven for example by new service requirements on low latency (e.g. aerial, industrial automation, industrial control) for which low interruption time shall be guaranteed.

As an example of one such improvement, Make-Before-Break (MBB) was introduced in LTE Rel-14 in purpose to shorten handover interruption time as close to 0 ms as possible. Please see FIG. 3*a* depicting Rel-14 LTE Make Before Break (MBB).

Step 1: The UE sends a measurement report to the source eNB.
  User data is transferred between the UE and the SGW.
Step 2: The source eNB determines a Handover (HO) decision.
Step 3: The source eNB sends a HO request to the target eNB.
Step 4: The target eNB sends a HO request ACK to the source eNB.
Step 5: The source eNB sends an RRC connection reconfiguration to the UE.
Step 6: The UE detaches from source cell.
Step 7: The source eNB sends an SN status transfer to the target eNB.
  The source eNB performs data forwarding to the target eNB.
Step 8: The UE performs a Random access procedures to the target eNB.
Step 9: The UE sends an RRC connection reconfiguration complete to the target eNB.
  User data is transferred between the UE and the target eNB.
Step 10: The target eNB sends a Path Switch Request to the MME.
Step 11: Path switch related signaling is transferred between the MME and SGW.
  User data is transferred between the target eNB and the SGW.
  The SGW sends an End Marker to the target eNB via the source eNB.
Step 12: The target eNB sends a Path Switch Request ACK to the MME.
Step 13: The target eNB sends a UEcontext release to the source eNB.

The MBB handover procedure as introduced in LTE Release-14, refers to a handover mechanism where the UE connects to the target cell before disconnecting from the source cell unlike the standard handover procedure where the UE resets MAC and re-establishes RLC and PDCP upon receiving the Handover Command message, e.g. RRCConnectionReconfiguration message with mobilityControlInfo, in the source cell. The mobilityControlInfo in the RRCConnectionReconfiguration message includes a field makeBeforeBreak, to instruct the UE 102 to keep the connection to the source cell 103.

From 3GPP TS 36.331 v 15.6.0:
makeBeforeBreak
  Indicates that the UE shall continue uplink transmission/downlink reception with the source cell(s) before performing the first transmission through PRACH to the target intra-frequency PCell, or performing initial PUSCH transmission to the target intra-frequency PCell while rach-Skip is configured.
  NOTE 1a: It is up to UE implementation when to stop the uplink transmission/downlink reception with the source cell(s) to initiate re-tuning for connection to the target cell, as specified in 3GPP TS 36.133 v16.2.0, if makeBeforeBreak is configured.

In the MBB solution, the connection to the source cell is maintained after the reception of Handover Command until the UE executes initial UL transmission in the target cell, i.e. MAC reset and RLC and PDCP re-establishment is delayed in the UE until the UE performs random-access in the target cell or, if MBB is combined with RACH-less handover, i.e. rach-Skip is present in the mobility Control Information (mobilityControlInfo), until the UE performs the initial PUSCH transmission. It is up to UE implementation, and UE capabilities, when to stop the UL transmission and/or DL reception with the source cell to initiate re-tuning for connection to the target cell.

At the point when the source eNB has stopped transmission/reception to/from the UE, the source eNB sends the SN STATUS TRANSFER message (action 8) to the target eNB to convey the uplink PDCP SN receiver status and the downlink PDCP SN transmitter status of the radio bearers for which PDCP status preservation applies.

MBB as specified in LTE Rel-14 3GPP TS 36.300 v14.10.0 and TS 36.331 v14.11.0 has some known limitations: Even if MBB and other improvements, such as RACH-less handover are combined it is still not possible to reach ~0 ms handover interruption time. MBB in Release-14 is only supported for intra-frequency handovers and assumes the UE is equipped with a single Reception (Rx (and/or Transmission (Tx) chain. In an intra-frequency handover scenario, a single Rx UE is capable of receiving from both target and source cell simultaneously, however, a single Tx UE will not be able to transmit to both cells simultaneously. Thus, in MBB Rel-14, the UE will release the connection to the source cell before the first UL transmission. This occurs when the UE transmits the RACH preamble; or transmits the Handover Complete message (if RACH-less HO is configured).

Consequently, the UE releases the connection with the source cell before the connection with the target cell is ready for packet transmission/reception which results in interruption time of ~5 ms.

3GPP Release-16 Enhanced Make-Before-Break (eMBB)

To address the shortcomings of Rel-14 MBB and achieve ~0 ms interruption time an enhanced version of Make-Before-Break (eMBB) is being discussed for Rel-16 both for LTE and NR. eMBB may also be referred to as Dual Active Protocol Stack (DAPS). In this enhanced version it is assumed that the UE is capable of simultaneously transmitting and receiving from the source and target cell. In practice, this may require that the UE is equipped with dual Tx/Rx chains. The dual Tx/Rx chains potentially also allows eMBB to be supported in other handover scenarios such as inter-frequency handover.

An example of an Enhanced Make-Before-Break (eMBB) inter-node handover is illustrated in FIG. 3b for the case of LTE.

Some highlights in this solution are:

In action 405, upon receiving the "eMBB" indication in the Handover Command, the UE maintains the connection to the source access node while establishing the connection to the target access node. That is, the UE can send and receive DL/UL user plane data via the source access node between action 405-408 without any interruption. And after action 408, the UE has the target link available for UL/DL user plane data transmission similar to the regular HO procedure.

In action 406, the source access node sends an SN status transfer message to the target access node, indicating UL PDCP receiver status and the SN of the first forwarded DL PDCP SDU. The uplink PDCP SN receiver status includes at least the PDCP SN of the first missing UL SDU and may include a bit map of the receive status of the out of sequence UL SDUs that the UE needs to retransmit in the target cell, if there are any such SDUs. The SN Status Transfer message also contains the Hyper Frame Number (HFN) of the first missing UL SDU as well as the HFN DL status for COUNT preservation in the target access node.

Once the connection setup with the target access node is successful, i.e. after sending the Handover Complete message in action 408, the UE maintains two data links, one to the source access node and one to the target access node. After action 408, the UE transmits the UL user plane data on the target access node similar to the regular HO procedure using the target access node security keys and compression context. Thus, there is no need for UL user plane data transmission to both nodes which avoids UE power splitting between two nodes and also simplifies UE implementation. In the case of intra-frequency handover, transmitting UL user plane data to one node at a time also reduces UL interference which increases the chance of successful decoding at the network side.

The UE needs to maintain the security and compression context for both source access node and target access node until the source link is released. The UE can differentiate the security/compression context to be used for a PDCP PDU based on the cell which the PDU is transmitted on.

To avoid packet duplication, the UE may send a PDCP status report together with the Handover Complete message in action 408, indicating the last received PDCP SN. Based on the PDCP status report, the target access node can avoid sending duplicate PDCP packets (i.e. PDCP PDUs with identical sequence numbers) to the UE, i.e. PDCP packets which were already received by the UE in the source cell.

The release of the source cell in action 413 can e.g. be triggered by an explicit message from the target access node (not shown in the figure) or by some other event such as the expiry of a release timer.

As an alternative to source access node starting packet data forwarding after action 405 (i.e. after sending the Handover Command to the UE), the target access node may indicate to the source access node when to start packet data forwarding. For instance, the packet data forwarding may start at a later stage when the link to the target cell has been established, e.g. after the UE has performed random access in the target cell. By starting the packet data forwarding in the source access node at a later stage, the number of duplicated PDCP SDUs received by the UE from the target cell will potentially be less and by that the DL latency will be somewhat reduced. However, starting the packet data forwarding at a later stage is also a trade-off between robustness and reduced latency if, e.g., the connection between the UE and the source access node is lost before the connection to the target access node is established. In such case there will be a short interruption in the DL data transfer to the UE.

FIG. 4 shows the protocol stack at the UE side in eMBB. Each user plane radio bearer has an associated PDCP entity which in turn has two associated RLC entities—one for the source cell and one for the target cell. The PDCP entity uses different security keys and Robust Header Compression (ROHC) contexts for the source and target cell while the SN allocation, for UL transmission, and re-ordering and/or duplication detection for DL reception is common. In the figure, MAC means Medium Access Control and PHY means the Physical layer.

Note that in case of NR, there is an additional protocol layer called Service Data Adaptation Protocol (SDAP) on top of PDCP which is responsible for mapping QoS flows to bearers. This layer is not shown in FIG. 4 and will not be discussed further in this document.

Note that the name "Enhanced Make-Before-Break" is not agreed yet and other names have also been proposed, such as "Handover with simultaneous connectivity", "Dual Active Protocol Stack Solution (DAPS)" etc. It also possible that LTE and NR will use different names for the feature. For example, LTE might use the name "Enhanced Make-Before-Break" to distinguish it from the LTE Release-14 Make-Before-Break, while NR may use the name "Make-Before-Break" since NR doesn't have any such legacy procedure.

SUMMARY

An object of embodiments herein is to improve the handling of source radio link related failures during handover in a wireless communications network.

According to an aspect of embodiments herein, the object is achieved by a method performed by a User Equipment, UE, for handling a source radio link during a handover from a source access node to a target access node in a wireless communications network. The UE is triggered UE to perform the handover. The UE establishes Radio Link Control, RLC, entities and associated target radio link with the target access node, while keeping RLC entities and associated source radio link with the source access node. The UE checks whether a source radio link related failure has occurred.

When a source radio link related failure has occurred, the UE checks the radio link related failure against a set of source radio link release UE criteria, and when one or more source radio link release UE criterion is fulfilled out of the set of source radio link release UE criteria, the UE handling the source radio link according to a predetermined rule.

According to another aspect of embodiments herein, the object is achieved by a method performed by a source access node for handling a source radio link during a handover of a User Equipment, UE, from a source access node to a target access node in a wireless communications network. The source access node sends an instruction to the UE. The instruction is to perform the handover to the target access node. The instruction comprises establishing Radio Link Control, RLC, entities and associated target radio link with the target access node, while keeping RLC entities and associated source radio link with the source access node. The source access node checks whether a source radio related failure has occurred. When a source radio link related failure has occurred, the source access node checks the radio link related failure against a set of source radio link release access node criteria. When one or more source radio link release access node criterion are fulfilled out of the set of source radio link release access node criteria, the source access node handles the source radio link according to a predetermined rule.

According to another aspect of embodiments herein, the object is achieved by a User Equipment, UE, configured to handle a source radio link during a handover from a source access node to a target access node in a wireless communications network. The UE is further being configured to:

Trigger the UE to perform the handover,
establish Radio Link Control, RLC, entities and associated target radio link with the target access node, while keeping RLC entities and associated source radio link with the source access node,
check whether a source radio link related failure has occurred,
when a source radio link related failure has occurred, check the radio link related failure against a set of source radio link release UE criteria, and
when one or more source radio link release UE criterion is fulfilled out of the set of source radio link release UE criteria, handle the source radio link according to a predetermined rule.

According to yet another aspect of embodiments herein, the object is achieved by a source access node configured to handle a source radio link during a handover of a User Equipment, UE, from a source access node to a target access node in a wireless communications network. The source access node is further configured to:

Send to the UE, an instruction to perform the handover to the target access node, adapted to comprise to establish Radio Link Control, RLC, entities and associated target radio link with the target access node, while keeping RLC entities and associated source radio link with the source access node,
check whether a source radio link related failure has occurred,
when a source radio link related failure has occurred, check the radio link related failure against a set of source radio link release access node criteria, and
when one or more source radio link release access node criterion is fulfilled out of the set of source radio link release access node, e.g. source access node, criteria, handle the source radio link according to a predetermined rule.

It is furthermore provided herein a computer program product comprising instructions, which, when executed on at least one processor, cause the at least one processor to carry out any of the methods above, as performed by the user equipment or the radio network node. It is additionally provided herein a computer-readable storage medium, having stored there on a computer program product comprising instructions which, when executed on at least one processor, cause the at least one processor to carry out the method according to any of the methods above, as performed by the radio network node or the user equipment.

BRIEF DESCRIPTION OF THE DRAWINGS

Examples of embodiments herein are described in more detail with reference to attached drawings in which.

DETAILED DESCRIPTION

As a part of developing embodiments herein the inventors identified a problem which first will be discussed.

Several types of failures may occur in conjunction with an eMBB handover, in particular related to the radio link between the UE and the source access node (here in often denoted the "source radio link"), and methods, procedures and rules for how to handle them are needed.

Several types of failures may occur in conjunction with an eMBB handover, in particular related to the radio link between a UE and a source access node, here in often denoted the "source radio link", and methods, procedures and rules for how to handle them are needed.

Figure 1:
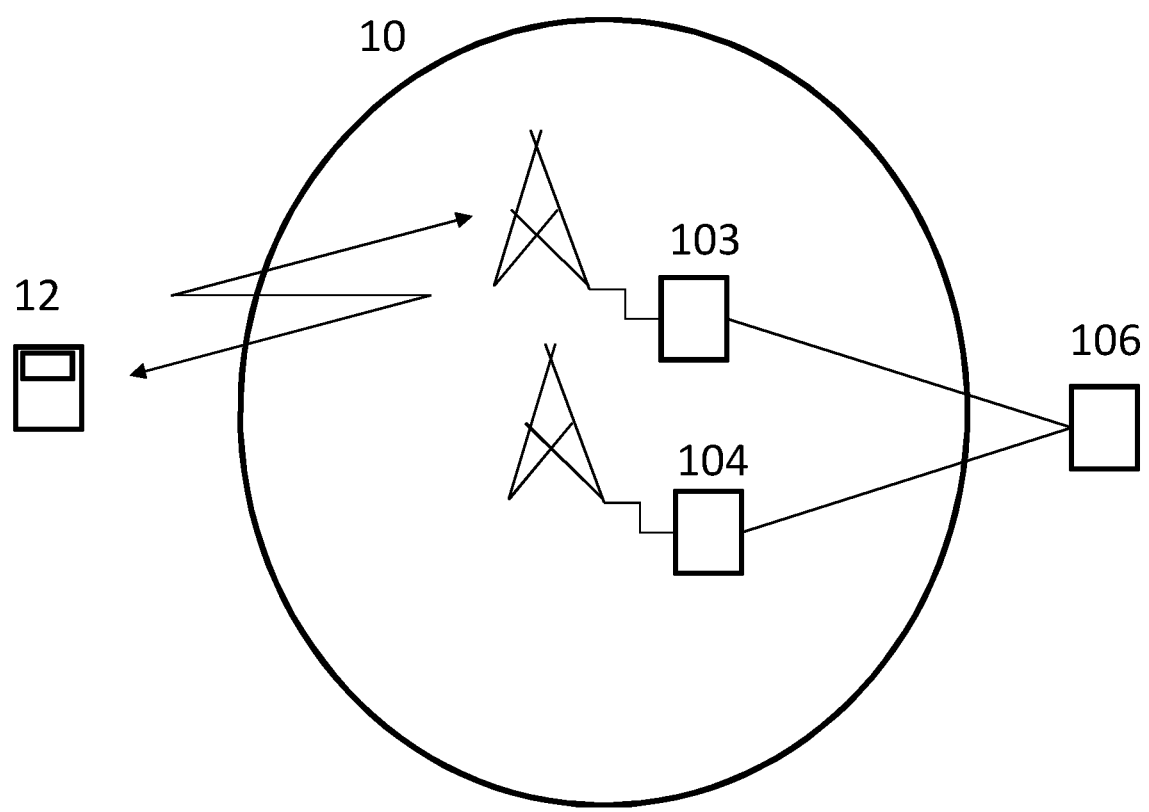
FIG. 1 is a schematic diagram illustrating prior art.
Figure 2:
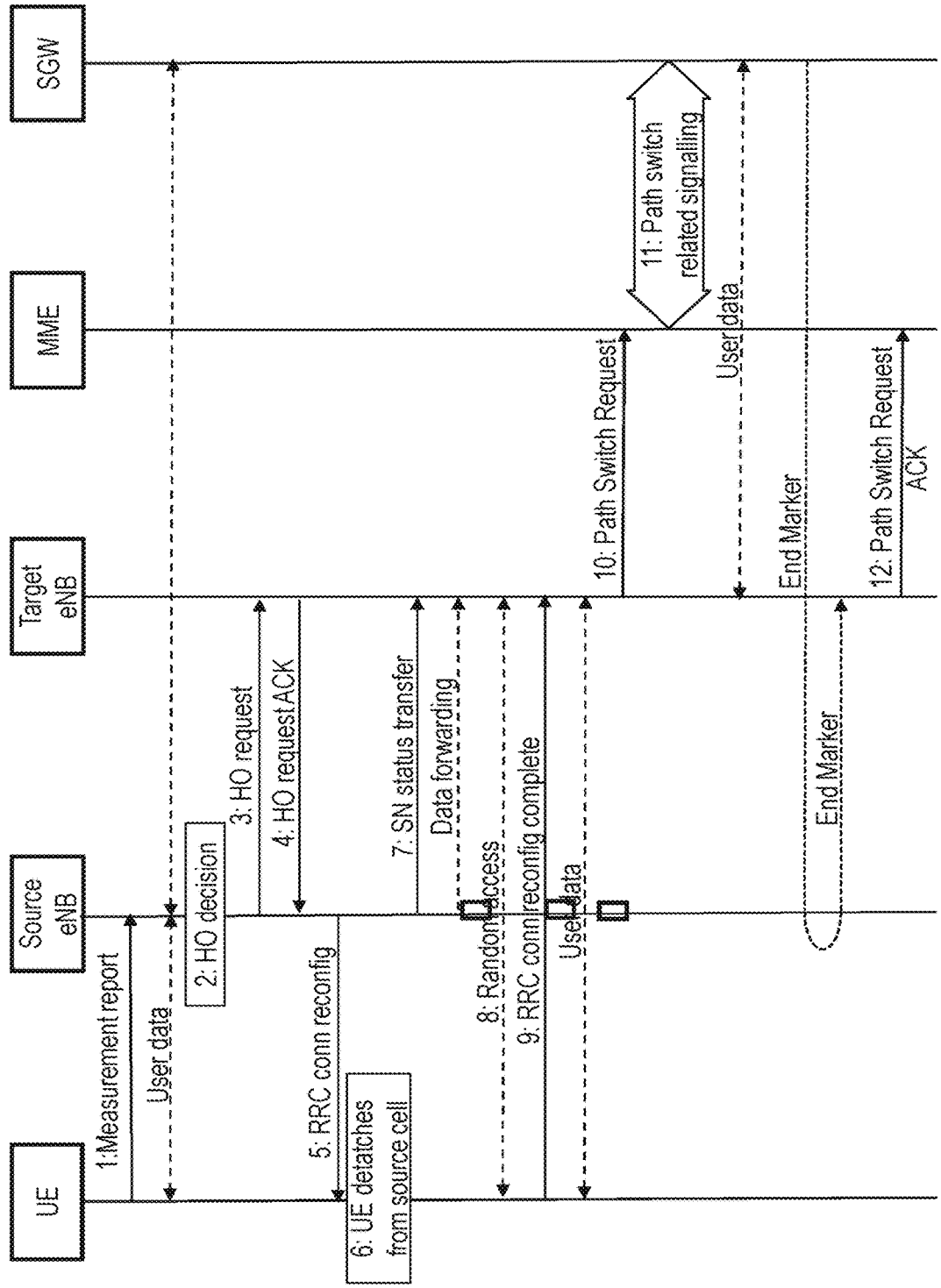
FIG. 2 is a sequence diagram depicting prior art.
Figure 3A:
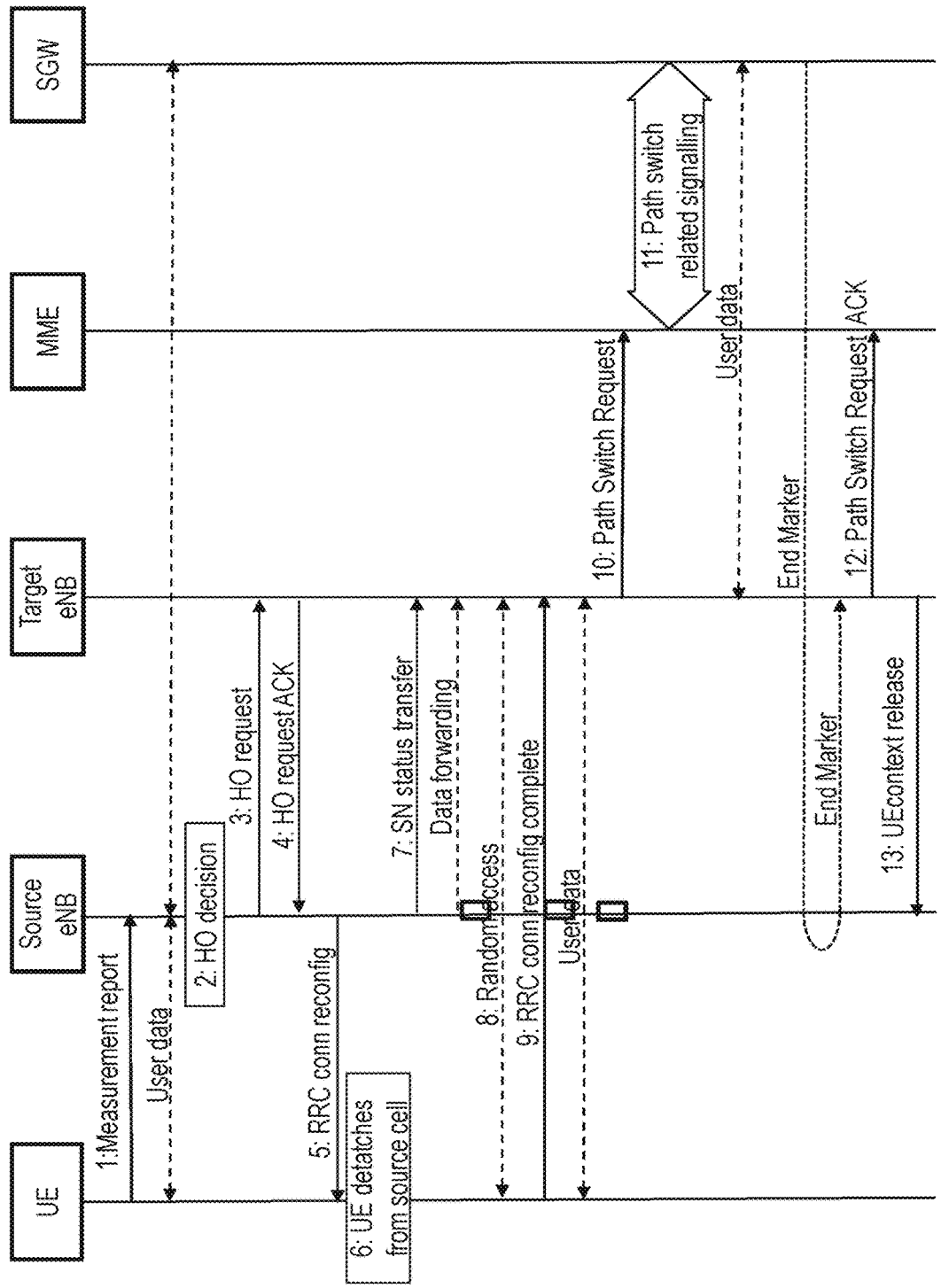
FIGS. 3 a and b are sequence diagrams depicting prior art.
Figure 3B:
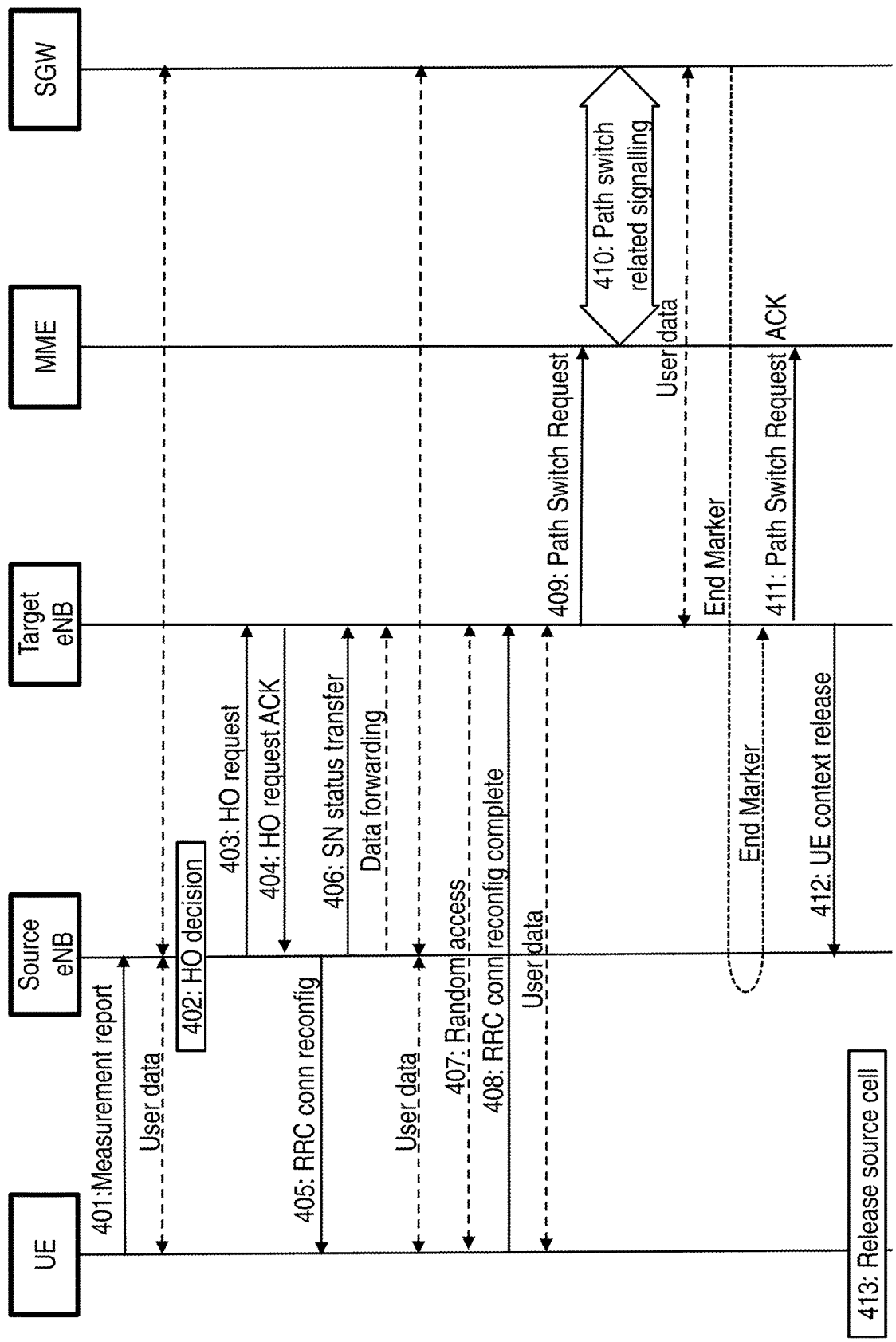
Figure 4:
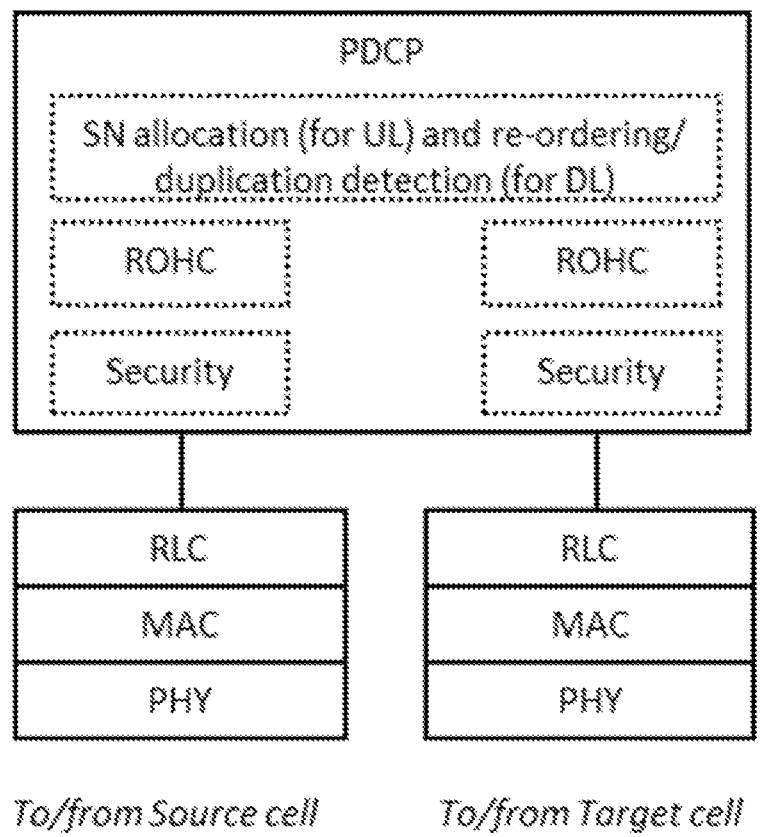
FIG. 4 is a schematic block diagram illustrating an embodiment herein.

In the enhanced make-before-break solution depicted in FIG. 3b, it has been agreed in 3GPP RAN2 that for LTE the UE switches its UL PUSCH transmissions to the target access node after action 408, when it receives the first UL grant from the target access node, for NR, the point in time when the UL transmission is switched from source to target is still for further study. But since the UE still receives DL data from also the source access node, for radio bearers using RLC AM, this node expects to receive RLC feedback (RLC STATUS PDUs) from the UE. PUSCH transmission to the source access node will not be possible as per the RAN2 agreement. From the source access node's point of view, it may not receive RLC acknowledgements of transmitted RLC AMD PDUs. When an RLC entity keeps retransmitting unacknowledged RLC AMD PDUs, at some point the maximum transmission count is reached without positive feedback, causing the RLC layer to indicate a failure to upper layers in the source access node. Since the source radio link quality is typically low, such as when the UE is at the source cell edge, these failures may be triggered in the UE as well. This is one example of a failure detected in the source access node and in the UE related to the source radio link.

Another case is when the Hybrid ARQ (HARQ) processes in the UE or source access node do not receive positive HARQ feedback from the peer entity, and the maximum number of retransmissions is reached. According to the 3GPP specifications for the UE, the HARQ process shall flush the HARQ buffer in this case. Assumedly, the source access node would have the same behavior. This is another example of a failure detected in the source access node and in the UE related to the source radio link.

The Radio Link Monitoring (RLM) performed by the source access node or the UE on the source radio link may also trigger a radio link failure indication in the source access node during the handover. This is yet another example of a failure detected in the source access node and the UE related to the source radio link.

A problem is therefore how the source access node and the UE handles failures related to the source radio link during make-before-break handover.

Another problem is how the source radio connection is released by the UE and the source access node, respectively, in a proper way, during make-before-break handover. More specifically, if the UE and the source access node do not release their mutual radio link simultaneously, the other end may experience one or more type(s) of failure.

An object of embodiments herein is therefore to improve the handling of source radio link related failures during handover in a wireless communications network.

The source link related failure may be referred to as a source cell connection failure.

The wordings source link related failure and source radio link related failure have the same meaning and may be used interchangeably herein.

Embodiments herein relate to wireless communication networks in general. FIG. is a schematic overview depicting a wireless communications network 100 wherein embodiments herein may be implemented. The wireless communications network 100 comprises one or more RANs and one or more CNs. The wireless communications network 100 may use a number of different technologies, such as Long Term Evolution (LTE), LTE-Advanced, 5G, New Radio (NR), Wideband Code Division Multiple Access (WCDMA), Global System for Mobile communications/ enhanced Data rate for GSM Evolution (GSM/EDGE), Worldwide Interoperability for Microwave Access (WMax), or Ultra Mobile Broadband (UMB), just to mention a few possible implementations. Embodiments herein relate to recent technology trends that are of particular interest in a 5G context, however, embodiments are also applicable in further development of the existing wireless communication systems such as e.g. WCDMA and LTE.

Access nodes operate in the wireless communications network 100 such as a source access node 111 and a target access node 112. The source access node 111 provides radio coverage over a geographical area, a service area referred to as a source cell 115, which may also be referred to as a beam or a beam group of a first radio access technology (RAT), such as 5G, LTE, W-Fi or similar. The target access node 112 also provides radio coverage over a geographical area, a service area referred to as a target cell 116, which may also be referred to as a beam or a beam group of a first radio access technology (RAT), such as 5G, LTE, W-Fi or similar. The first and second access nodes 111, 112 may each be a NR-RAN node, transmission and reception point e.g. a base station, a radio access node such as a Wireless Local Area Network (WLAN) access point or an Access Point Station (AP STA), an access controller, a base station, e.g. a radio base station such as a NodeB, an evolved Node B (eNB, eNode B), agNB, a base transceiver station, a radio remote unit, an Access Point Base Station, a base station router, a transmission arrangement of a radio base station, a stand-alone access point or any other network unit capable of communicating with a wireless device within the service area served by the respective source and target access node 111, 112 depending e.g. on the first radio access technology and terminology used. The respective source and target access node 111, 112 may be referred to as serving radio access nodes and communicates with a UE with Downlink (DL) transmissions to the UE and Uplink (UL) transmissions from the UE.

A number of UEs operate in the wireless communication network 100, such as a UE 120. The UE 120 may be a mobile station, a non-access point (non-AP) STA, a STA, a user equipment and/or a wireless terminals, that communicate via one or more Access Networks (AN), e.g. RAN, e.g. via the source and/or target access nodes 111, 112 to one or more core networks (CN) e.g. comprising a CN node 130. It should be understood by the skilled in the art that "UE" is a non-limiting term which means any terminal, wireless communication terminal, user equipment, Machine Type Communication (MTC) device, Device to Device (D2D) terminal, or node e.g. smart phone, laptop, mobile phone, sensor, relay, mobile tablets or even a small base station communicating within a cell.

Figure 5:
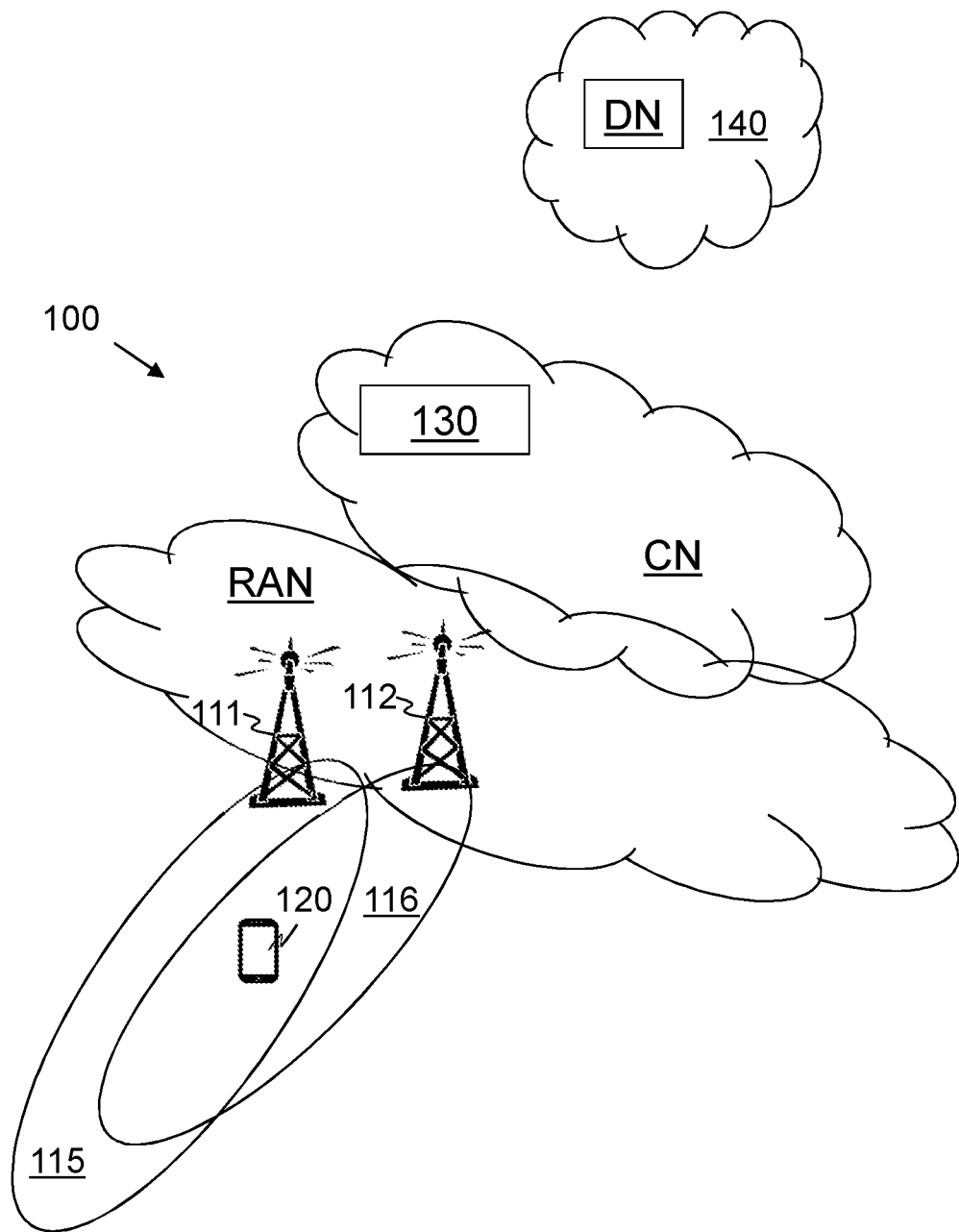
FIG. 5 is a schematic block diagram illustrating embodiments of a wireless communications network.

Methods herein may in a first aspect be performed by the UE 120 and in a second aspect by the source access node 111. As an alternative, a Distributed Node (DN) and functionality, e.g. comprised in a cloud 140 as shown in FIG. 5, may be used for performing or partly performing the methods.

Radio Link Monitoring (RLM) in LTE and NR

Radio Link Monitoring (RLM) is a procedure in RRC_CONNECTED to keep track of the radio link condition so that appropriate actions can be taken if Radio Link Failure (RLF) is declared.

In one example of radio link monitoring procedure (this main principle is used in both LTE and NR), the physical layer in the UE continuously monitors the e.g. downlink quality of received signals from the access node and at a certain criterion, the physical layer provides an "out-of-sync" indication to the RRC layer in the UE. A corresponding radio link monitoring may also be performed by an access node in the uplink direction.

In the UE, according to 3GPP specifications, such as the UE 120, upon a certain number of (known as the parameter N310) consecutive "out-of-sync" indications, the RRC layer starts a timer (known as T310). If the physical layer then provides a certain number of "in-sync" indications while this timer is running, the UE, such as the UE 120, has recovered from a sync problem and stops the timer. If the timer expires, this triggers a radio link failure (RLF) condition, which typically leads to an RRC connection re-establishment.

In the access node, it is up to network implementation when to trigger a radio link failure and how to act on such failures.

Hybrid ARQ in LTE and NR

Hybrid ARQ (HARQ) for LTE and NR is specified in 3GPP TS 36.321 and 38.321, respectively. In the UE, there is one HARQ entity at the MAC entity for each Serving Cell with configured uplink, which maintains a number of parallel HARQ processes allowing transmissions to take place continuously while waiting for the HARQ feedback on the successful or unsuccessful reception of previous transmissions.

Each HARQ process maintains a HARQ buffer with MAC PDUs to be transmitted/retransmitted. The Hybrid ARQ (HARQ) processes performs retransmissions when it does not receive positive HARQ feedback (known as an ACK) from the UE, up to a maximum number of transmissions. When this maximum number of transmissions has been reached, the HARQ process flushes its HARQ buffer. It would be up to the upper layers, to handle data loss caused by this, for example a retransmission performed by an RLC AM entity.

According to some embodiments herein, when a make-before-break handover is in progress, the UE 120 monitors source radio link related failures against a certain set of source radio link release UE criteria. When a source radio link release UE criterion is fulfilled, the UE 120 takes appropriate actions, typically involving release of the source radio connection. A release of the source radio link may comprise a release of a source cell and/or a release of the Source Master Cell Group (MCG).

According to some other examples of embodiments herein, when a make-before-break handover is in progress, the source access node monitors source radio link related failures against a certain set of source radio link release access node criteria. When a source radio link release access node criterion is fulfilled, the source access node assumes that the UE 120 has moved to the target cell and takes appropriate actions such as releasing the source radio connection.

Appropriate methods to handle failure cases related to eMBB handover are provided. In some embodiments, the source access node 111 keeps the source radio connection and does not release it until only after the UE 120 has released the connection. This makes sure resources, such as e.g. radio resources, memory, and processing resources, are released in a timely manner and still avoids data loss due to a too early release.

Figure 6:
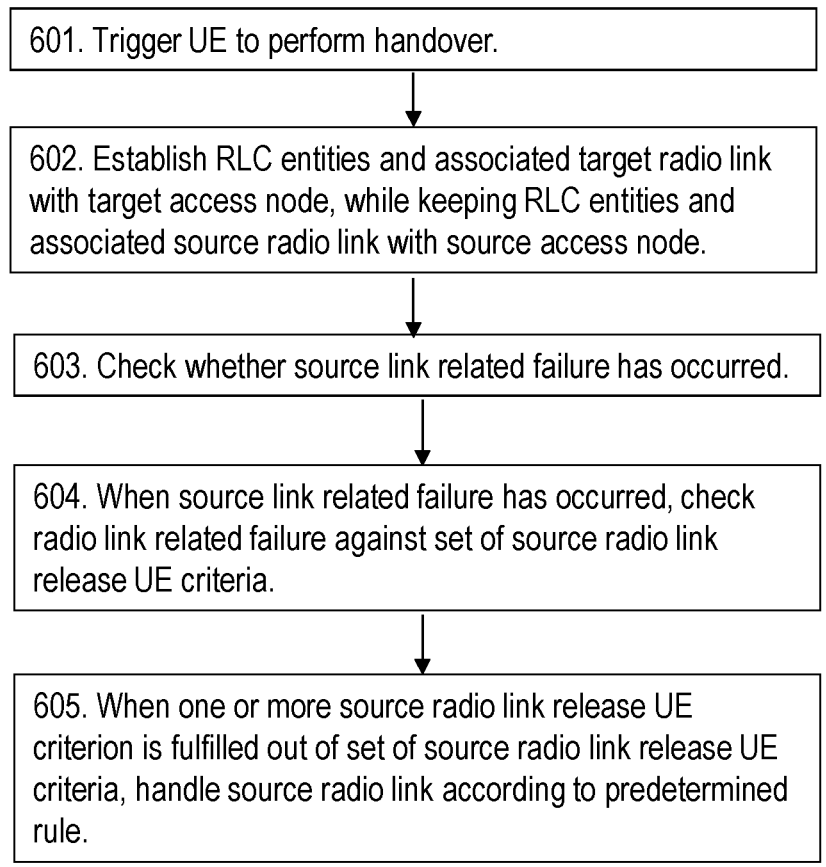
FIG. 6 is a flowchart depicting embodiments of a method in a UE.

FIG. 6 shows an example method performed by the UE 120. The method may be for handling a source radio link during a handover from a source access node 111 to a target access node 112 in a wireless communications network 100.

The method and will first be described in brief, thereafter in more detail. The method comprises one or more of the following actions, which actions may be taken in any suitable order.

Action 601: The UE 120 is triggered to perform the handover.

Action 602: The UE 120 establishes Radio Link Control, RLC, entities and associated target radio link with the target access node 112, while the UE 120 keeps RLC entities and associated source radio link with the source access node 111.

Action 603: The UE 120 checks whether a source radio link related failure has occurred.

Action 604: When a source radio link related failure has occurred, the UE 120 checks the radio link related failure against a set of source radio link release UE criteria.

Action 605: When one or more source radio link release UE criterion is fulfilled out of the set of source radio link release UE criteria, the UE 120 handles the source radio link according to a predetermined rule.

In some embodiments, the predetermined rule comprises to release the radio link to the source access node 111.

The release of the radio link to the source access node 111 may comprise a release of the source cell connection the source access node 111. As mentioned above, a release of the source radio link may comprise a release of a source cell and/or a release of the Source Master Cell Group (MCG).

In some embodiments upon a certain number of consecutive out-of-synchronization indications such as for the source radio link, the UE 120 starts a timer. If the timer expires, the UE 120 triggers a Radio Link Failure (RLF) condition. The timer may e.g. be represented by a T310.

In this way resources such as e.g. radio resources, memory, and processing resources are released in a timely manner and still avoid data loss due to a too early release. This is since, for example, a too early release may cause pending downlink data from the source access node 111 to be lost. But in case of radio link failure on the source radio link, no more data will be received from the source access node 111 and thus the source radio link can safely be released.

To handle the source radio link according to a predetermined rule may e.g. mean that the UE 120 decides whether or not to release the source radio link.

The predetermined rule may comprise one or more rules. To handle the source radio link according to one or more predetermined rules, may e.g. mean that the UE 120 handles the source radio link according to different rules depending on which one or more source radio link release UE criterion that are fulfilled out of the set of source radio link release UE criteria.

The method according to the actions above will now be described and explained in more detail in the following examples.

Action 601: The UE 120 is triggered to perform a handover to the target access node 112, for example by receiving a Handover Command message, such as an RRCReconfiguration message with a reconfigurationWithSync IE in NR or RRCConnectionReconfiguration message with a mobilityControlInfo Information Element (IE) in LTE. In this example, the UE 120 is instructed to perform a make-before-break handover, also known as enhanced make-before-break.

Action 602: The UE 120 establishes RLC entities and associated target radio link with the target access node 112. Establishing RLC entities and associated target radio link with the target access node 112 when used herein in may e.g. mean that the UE 120 obtains synchronization with in the target cell, performs a random access procedure towards the target access node 112 and then creates the RLC entities according to the configuration, all as instructed by the received Handover Command message. This may mean that the UE 120 establishes a radio connection with the target access node 112. Due to the type of handover (make-before-break or enhanced make-before-break) it keeps the radio connection to the source access node 111.

Action 603: The UE 120 checks if a source radio link related failure has occurred. One example of such a failure is when the maximum RLC retransmission count has been reached, without positive feedback, for a radio bearer. Another example of such a failure is when the Hybrid ARQ (HARQ) processes in the UE 120 do not receive positive HARQ feedback from the source access node, and the maximum number of retransmissions is reached. Yet another example of such a failure is when the radio Link Monitoring (RLM) performed by the UE 120 on the source radio link triggers a radio link failure. If no source radio link related failure has occurred the UE 120 performs the same check again.

Action 604: If a source radio link related failure has occurred in action 603, the UE 120 checks the radio link related failure against a set of source radio link release UE criteria. Examples of source radio link release UE criteria are provided below. If none of the criteria is fulfilled, the UE 120 goes back to action 603.

Action 605: If a source radio link release UE criterion is fulfilled, the UE 120 takes appropriate actions. This means that the UE 120 handles the source radio link according to a predetermined rule, e.g. according to the below examples.

In one example, UE 120 releases the radio connection to the source access node 111 without sending an indication to the target access node 112.

In another example, the UE 120 releases the radio connection to the source access node 111 and sends a message to the target access node 112 indicating that the UE 120 has released the radio connection to the source access node 111. This may trigger the target access node 112 to inform the source access node 111 accordingly. In the message informing the target access node 112 that the UE 120 has released the source radio link, the UE 120 may also include a PDCP Status Report per bearer, indicating the sequence number of the last successfully received DL PDCP SDU and/or a bitmap indicating success/failure of the latest DL PDCP SDUs.

In another example, the UE 120 does not release the radio connection to the source access node 111, but instead sends a message to the target access node 112 informing that a source radio link release UE criterion is fulfilled, leaving further actions to the target access node 112. This message to the target access node 112 may include a PDCP Status Report per bearer, indicating the sequence number of the last successfully received DL PDCP SDU and/or a bitmap indicating success/failure of the latest DL PDCP SDUs. The appropriate action(s) may involve that the UE 120 attempts to signal to the source access node 111 that the UE 120 releases the source radio link. Optionally, different source radio link release UE criteria may be associated with different appropriate actions.

Figure 7:
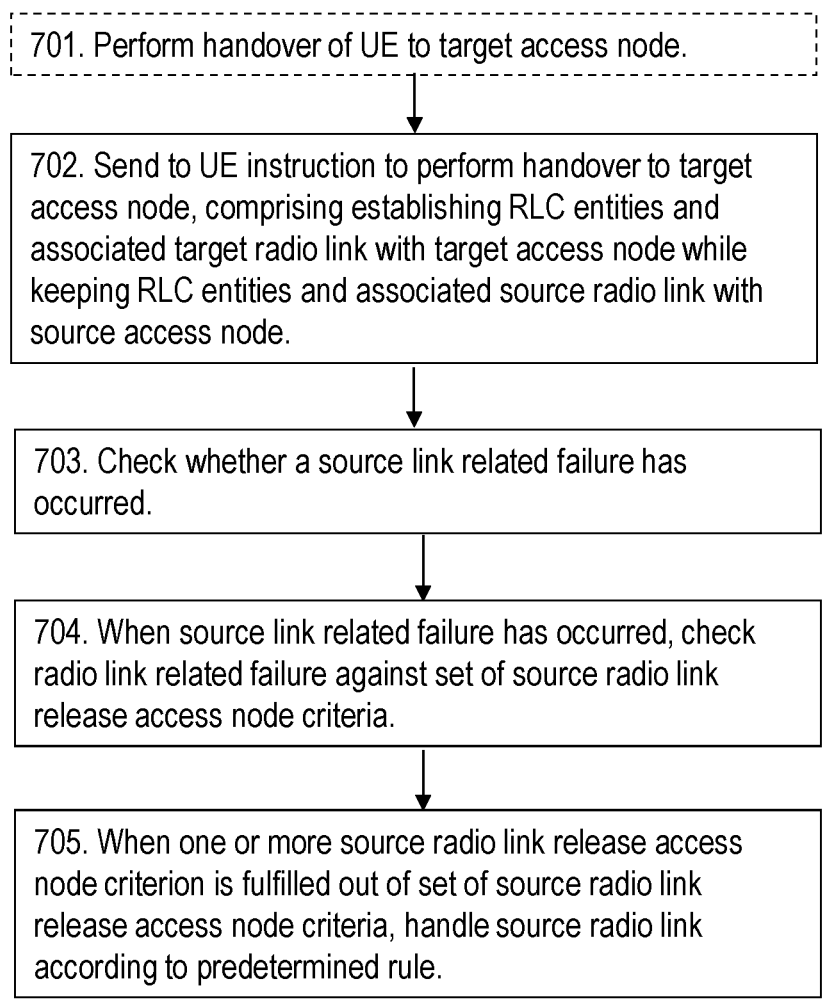
FIG. 7 is a flowchart depicting embodiments of a method in a source access node.

FIG. 7 shows an example method performed by the source access node 111 e.g. for handling a source radio link during a handover of the UE 120 from the source access node 111 to the target access node 112 in the wireless communications network 100.

The method and will first be described in brief, thereafter in more detail. The method comprises one or more of the following actions, which actions may be taken in any suitable order.

Action 701: In some embodiments the source access node 111 is triggered to perform a handover of the UE 120 to the target access node 112.

Action 702: The source access node 111 sends to the UE 120, an instruction to perform the handover to the target access node 112, comprising establishing Radio Link Control (RLC) entities and associated target radio link with the target access node 112, while keeping RLC entities and associated source radio link with the source access node 111.

Action 703: The source access node 111 checks whether a source radio link related failure has occurred.

Action 704: When a source radio link related failure has occurred, the source access node 111 checks the radio link related failure against a set of source radio link release access node criteria.

Action 705: When one or more source radio link release access node criterion are fulfilled out of the set of source radio link release access node, e.g. source access node, criteria, the source access node 111 handles the source radio link according to a predetermined rule.

In some embodiments, the predetermined rule comprises to release the radio link to the source access node 111.

To handle the source radio link according to a predetermined rule, may e.g. mean that the source access node 111 decides whether or not to release the source radio link.

The predetermined rule may comprise one or more rules. To handle the source radio link according to one or more predetermined rules, may e.g. mean that the source access node 111 handles the source radio link according to different rules depending on which one or more source radio link release access node criterion that are fulfilled out of the set of source radio link release access node criteria.

The method will now be described and explained in more detail in the following examples.

Action 701: The source access node 111 is triggered to perform a handover of the UE 120 to the target access node 112. An example of such a trigger is reception of a measurement report message from the UE 120 indicating that the respective radio channel quality of the target cell and the source cell fulfil certain criteria.

Action 702: The source access node 111 sends a Handover Command message to the UE 120 instructing the UE 120 to perform handover to the target access node 112. It may also prepare the target access node 112 for the handover. It is herein assumed that the type of handover the UE 120 is instructed to perform is make-before-break or enhanced make-before-break. It is also possible for the source access node 111 to prepare multiple target access nodes and the type of handover is then known as a conditional handover (possibly combined with the make-before-break or enhanced make-before-break functionality).

Action 703: The source access node 111 checks if a source radio link related failure has occurred. One example of such a failure is when the maximum RLC retransmission threshold has been reached (without positive feedback) for a radio bearer. Another example of such a failure is when the Hybrid ARQ (HARQ) processes in the source access node 111 do not receive positive HARQ feedback from the UE 120, and the maximum number of retransmissions is reached. Yet another example of such a failure is when the radio Link Monitoring (RLM) performed by the source access node 111 on the source radio link triggers a radio link failure. If no source radio link related failure has occurred the source access node 111 performs the same check again.

Action 704: If a source radio link related failure has occurred in action 703, the source access node 111 checks the radio link related failure against a set of source radio link release access node criteria. Examples of source radio link release access node criteria are provided below. If none of the criteria is fulfilled, the source access node 111 may go back to action 703.

Action 705: If a source radio link release access node criterion is fulfilled, the source access node 111 takes appropriate action(s). One example of such an action is to release the radio connection with the UE 120. Another example of such an action is to keep the radio connection with the UE 120. Yet another example of such an action is to send a message to the target access node 112 that the radio connection with the UE 120 has been released. Another example of such an action is to release the radio connection with the UE 120 and to send an SN Status Transfer message to the target access node 112 informing of the downlink and uplink PDCP Sequence Number and HFN transmitter and receiver status for each bearer for which PDCP status preservation applies. The appropriate action(s) may also involve an attempt to signal to the UE 120 that the source access node 111 releases the source radio link. The source access node 111 may attempt to transmit this signal directly to the UE 120, or the target access node 112 may be triggered by a message from the source access node 111 to inform the UE 120 that the source access node 111 has released the source radio link. This may be an explicit indication or an implicit indication (e.g. implied by another signaled action or information). Optionally, different source radio link release access node criteria may be associated with different appropriate actions.

Examples of Source Radio Link Release UE Criteria

One example of a source radio link release UE criterion is that the number of radio bearers for which the maximum RLC retransmission threshold has been reached (without positive feedback) is above a threshold. In one alternative, the threshold is configured by the network and provided to the UE 120 in e.g. the Handover Command message or in the system information broadcasted in each cell. Another alternative is that the threshold is specified in the standard. In another example, the source radio link release UE criterion is that the maximum RLC retransmission count has been reached (without positive feedback) for at least one radio bearer. In yet another example, the source radio link release UE criterion is that the maximum RLC retransmission count has been reached (without positive feedback) for all radio bearers. In yet another example, the UE 120 is configured (using RRC signalling) with an alternative maximum RLC retransmission threshold for each radio bearer or for each logical channel. This alternative maximum RLC retransmission threshold is used by the UE 120 during handover (or during make-before-break handover) instead of the maximum RLC retransmission threshold configured for normal operation.

In yet another example, the source radio link release UE criterion is that the number of Hybrid ARQ (HARQ) processes in the UE 120 for which maximum number of transmissions is reached is above a threshold. In one alternative, the threshold is configured by the network and provided to the UE 120 in e.g. the Handover Command message or in the system information broadcasted in each cell. Another alternative is that the threshold is specified in the standard. In yet another example, the source radio link release UE criterion is that one Hybrid ARQ (HARQ) process in the UE 120 has reached the maximum number of retransmissions. In yet another example, the source radio link release UE criterion is that all Hybrid ARQ (HARQ) process in the UE 120 has reached the maximum number of retransmissions. In yet another example, the UE 120 is configured (using RRC signalling) with an alternative maximum HARQ transmission count. This alternative maximum HARQ transmission count is used by the UE 120 during handover (or during make-before-break handover) instead of the maximum HARQ transmission count configured for normal operation In yet another example, the source radio link release UE criterion is that radio Link Monitoring (RLM) performed by the UE 120 on the source radio link triggers a radio link failure.

In yet another example, the source radio link release UE criterion is a combination of at least two of the above criteria. In one alternative, the source radio link release UE criterion, or the combination hereof, is configured by the network. As one attractive alternative, a set of source radio link release UE criteria are configured by the network, e.g. all or some of the above-mentioned criteria and the UE 120 is triggered to perform appropriate actions, e.g. involving release of the source radio link, if at least one of the configured source radio link release UE criteria is fulfilled.

The set of source radio link release UE criteria may comprise that a maximum RLC retransmission count has been reached for at least one RLC entity associated with the source radio link.

Another alternative is that all the configured source radio link release UE criteria have to be fulfilled before the UE 120 performs the associated appropriate action(s), potentially (and typically) involving releasing the source radio link. Yet another alternative is that out of a configured set of at least three criteria, one of the criteria is regarded as required/mandatory to fulfil, while at least one of the remaining criteria also has to be fulfilled in order for the UE 120 to perform the associated appropriate action(s), typically including releasing the source radio link.

Note: It is a matter of terminology definition what you define as a source radio link release UE criterion in the case where a set of multiple criteria are configured and the appropriate action(s) (typically involving release of the source radio link) is/are triggered if a certain combination (different alternatives are described above) of the criteria are fulfilled. Either you denote each criterion in the set a "source radio link release UE criterion" or you denote the condition for execution of the appropriate action(s) (typically involving release of the source radio link), i.e. the certain combination of fulfilled criteria, the "source radio link release UE criterion". The same terminology question/choice is relevant for the definition of the term "source radio link release access node criterion".

Examples of Source Radio Link Release Access Node Criteria

One example of the source radio link release UE criterion, e.g. a source radio link release access node criterion, is that the number of radio bearers, associated with a certain UE such as the UE 120 for which the maximum RLC retransmission count has been reached, without positive feedback, is above a threshold.

In another example, the source radio link release UE criterion, e.g. the source radio link release access node criterion, is that the maximum RLC retransmission count has been reached, without positive feedback, for at least one radio bearer.

In yet another example, the source radio link release UE criterion, e.g. the source radio link release access node criterion is that maximum RLC retransmission count has been reached (without positive feedback) for all radio bearers.

In yet another example, the source radio link release UE criterion, e.g. the source radio link release access node criterion is that the number of Hybrid ARQ (HARQ) processes in the source access node 111 for which maximum number of retransmissions is reached is above a threshold.

In yet another example, the source radio link release UE criterion, e.g. the source radio link release access node criterion is that one Hybrid ARQ (HARQ) process in the access node has reached the maximum number of retransmissions. In yet another example, the source radio link release UE criterion is that all Hybrid ARQ (HARQ) process in the source access node 111 has reached the maximum number of retransmissions.

In yet another example, the source radio link release UE criterion, e.g. the source radio link release access node criterion is that radio Link Monitoring (RLM) performed by the source access node 111 on the source radio link triggers a radio link failure.

In yet another example, the source radio link release UE criterion, e.g. the source radio link release access node criterion is a combination of at least two of the above criteria.

As one attractive alternative, a set of source radio link release UE criterion, e.g. a set of source radio link release access node criteria are used, e.g. all or some of the above-mentioned criteria and the source access node 111 is triggered to perform appropriate actions, e.g. involving release of the source radio link, if at least one of the source radio link release access node criteria is fulfilled.

Another alternative is that all the source radio link release UE criterion, e.g. all the source radio link release access node criteria have to be fulfilled before the source access node 111 performs the associated appropriate action(s), potentially, and typically, involving releasing the source radio link.

Yet another alternative is that out of a set of at least three criteria, one of the criteria is regarded as required/mandatory to fulfil, while at least one of the remaining criteria also has to be fulfilled in order for the source access node 111 to perform the associated appropriate action(s), typically including releasing the source radio link.

Handling Multiple Fulfilled Criteria Such as Source Radio Link Release UE Criteria The source radio link release UE criteria are referred to as criteria in the below examples.

If multiple criteria out of a set of criteria are fulfilled, be it source radio link release UE criteria or source radio link release access node criteria, the UE 120 or source access node 111 handles the source radio link according to a predetermined rule e.g. by performing actions associated with all of them, to the extent they can be combined. If non-combinable, e.g. opposing and/or counteracting and/or incompatible, actions are associated with different fulfilled criteria, then the criteria may have different associated priorities and only the actions, out of the non-combinable actions, of the criterion with the highest priority are performed. Note that combinable, non-problematic actions associated with all fulfilled criteria can still be performed.

As mentioned above, the UE 120 is handling the source radio link according to a predetermined rule, this may mean that the UE 120 handling the source radio link according to a predetermined action, i.e. the predetermined rule is a predetermined action such as action A and B below. Further, the predetermined rule such as the predetermined action may be dependent on the kind of or the number of of the one or more fulfilled criteria out of the set of criteria.

As an option, if the action A is stipulated by a first set of N fulfilled criteria and action B, which opposes, counteracts or is incompatible with action A (i.e. is not combinable with action A) is stipulated by a second set of M fulfilled criteria, then action A may be performed at the expense of action B (which is not performed) if N>M, even if the fulfilled criterion with the highest priority belongs to the second set.

As yet another option, if action A is stipulated by a first set of N fulfilled criteria and action B, which opposes, counteracts or is incompatible with action A (i.e. is not combinable with action A) is stipulated by a second set of M fulfilled criteria, then the one of action A and B that is performed may be determined by the sum of the priorities (or other type of importance-related parameters) associated with the criteria of the respective first and second sets. For instance, if a priority range of 1-10 is used (where 1 is the highest priority and 10 is the lowest priority), then the priorities associated with criteria may be translated into importance parameters, Pimp, where the highest priority, 1, is translated to the highest importance factor Pimp=10 and the lowest priority, 10, is translated to the lowest importance factor Pimp=1, according to the formula Pimp=11−priority. Then the importance factors of the respective criteria are summed for the respective sets and the set accumulating the greatest sum of importance factors determines which action that is performed. For instance, if the sum of importance factors for the second set is greater than the sum of the importance factors for the first set, then action B is performed, but not action A.

Other types of algorithms and/or formulas using priorities or other importance-related parameters associated with criteria may also be used to determine which out of two opposing and/or counteracting and/or non-combinable and/or non-compatible actions that should be performed.

Some embodiments that are provided e.g. comprise the following:

1. A method in the UE 120 to perform handover from the source access node 111 to the target access node 112, comprising
   a. Establish a radio connection with the target access node 112 while keeping the radio connection to the source access node 111,
   b. Detect a source radio link related failure
   c. Check the failure against a set of source radio link release UE criteria.
2. Method in 1, when a source radio link release UE criterion is fulfilled, release the radio connection from the source access node 111
3. Method in 1, when a source radio link release UE criterion is fulfilled, the UE 120 sends a message to the target access node 112
4. Method in 3, where the message indicates that the UE 120 has released the radio connection from the source access node 111.
5. Method in 1, where the source radio link release UE criterion is when . . . , (see above) . . .
6. A method in a source access node 111 to perform a handover of the UE 120 to the target access node 112, comprising:
   a. Send a Handover command message to the UE 120 instructing the UE 120 to perform handover to the target access node 112
   b. Detect a source radio link related failure
   c. Check the failure against a set of source radio link release access node criteria.
7. Method in 6, when a source radio link release access node criterion is fulfilled, release the radio connection from the UE 120.
8. Method in 6, when a source radio link release access node criterion is fulfilled, send a message to the target access node 112.
9. Method in 8, where the message indicates that the source access node 111 has released the radio connection from the UE 120.

10. Method in 6, where the source radio link release access node criterion is when . . . (see above).

Figure 8A:
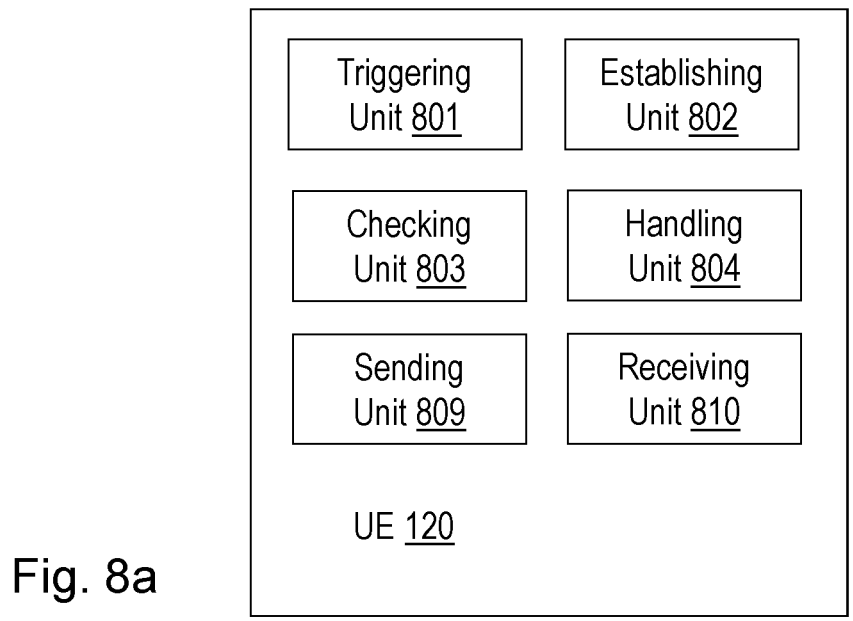
FIGS. 8 a and b are schematic block diagrams illustrating embodiments herein.
Figure 8B:
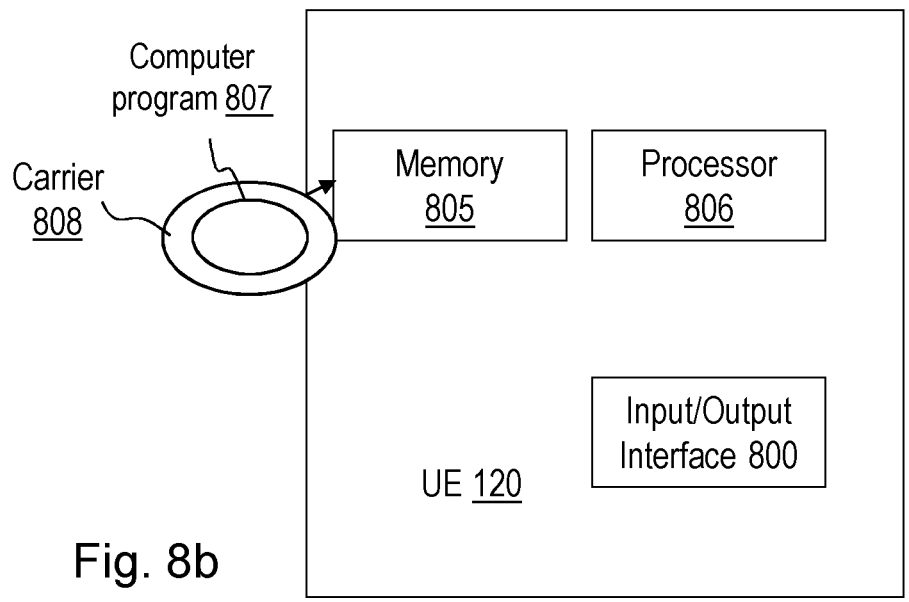
Figure 9A:
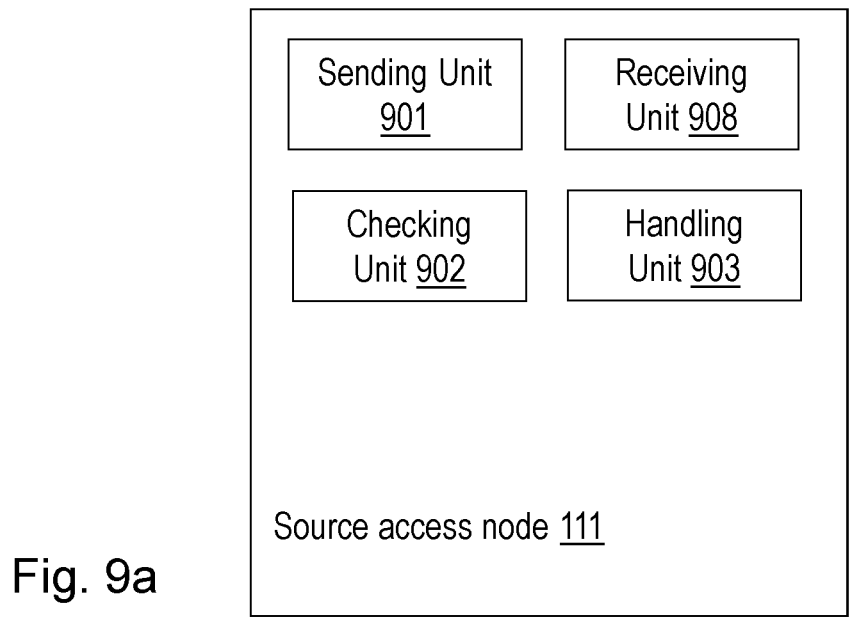
FIGS. 9 a and b are schematic block diagrams illustrating an embodiment of a UE.
Figure 9B:
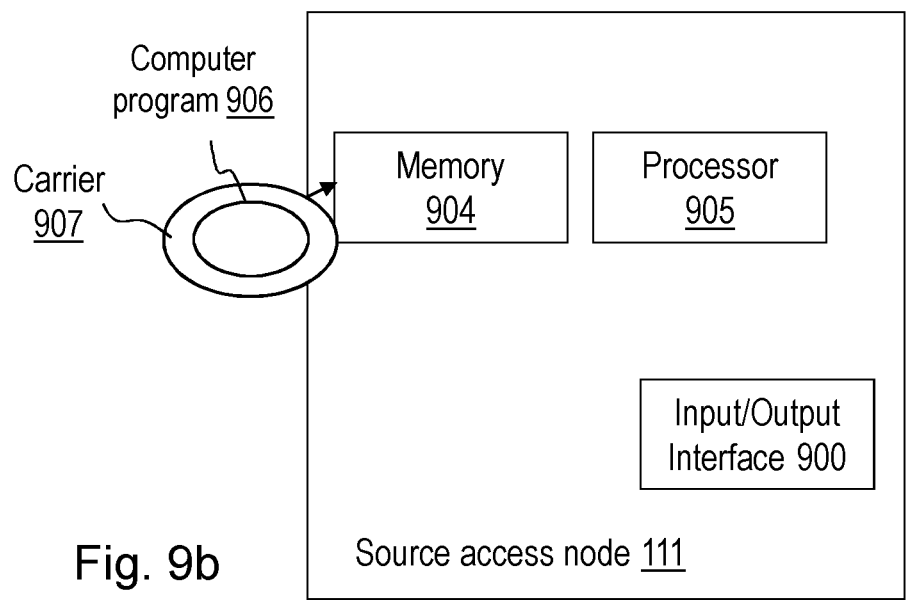

FIGS. 8a and 8b shows an example of the UE 120, and FIGS. 9a and 9b shows an example of the source access node 111.

The UE 120 and the source access node 111, may comprise a respective input and output interface 800, 900 configured to communicate with each other, see FIGS. 8b and 9b. The input and output interface may comprise a wireless receiver (not shown) and a wireless transmitter (not shown).

The UE 120 may further comprise a triggering unit 801, an establishing unit 802, a checking unit 803, a handling unit 804, a sending unit 809 and a receiving unit 810, see FIG. 8a.

The source access node 111 may further comprise a sending unit 901, a checking unit 902, a handling unit 903 and a receiving unit 908, see FIG. 9a.

The embodiments herein may be implemented through a respective processor or one or more processors, such as the respective processor 806 and 905 of a processing circuitry in the UE 120 and the source access node 111, and depicted in FIGS. 8b, and 9b together with computer program code for performing the functions and actions of the embodiments herein. The program code mentioned above may also be provided as a computer program product, for instance in the form of a data carrier carrying computer program code for performing the embodiments herein when being loaded into the respective UE 120 and source access node 111. One such carrier may be in the form of a CD ROM disc. It is however feasible with other data carriers such as a memory stick. The computer program code may furthermore be provided as pure program code on a server and downloaded to the respective UE 120 and source access node 111.

The UE 120 and the source access node 111 may further comprise a respective memory 805 and 904 comprising one or more memory units. The memory comprises instructions executable by the processor in the source access node 111, the target access node 112 and the UE 120.

Each respective memory 805 and 904 is arranged to be used to store e.g. information, data, configurations, and applications to perform the methods herein when being executed in the respective UE 120 and source access node 111.

In some embodiments, a respective computer program 807 and 906 comprises instructions, which when executed by the at least one processor, cause the at least one processor of the respective UE 120 and source access node 111 to perform the actions above.

In some embodiments, a respective carrier 808 and 907 comprises the respective computer program, wherein the carrier is one of an electronic signal, an optical signal, an electromagnetic signal, a magnetic signal, an electric signal, a radio signal, a microwave signal, or a computer-readable storage medium.

Those skilled in the art will also appreciate that the units in the units described above may refer to a combination of analog and digital circuits, and/or one or more processors configured with software and/or firmware, e.g. stored in the respective UE 120 and source access node 111, that when executed by the respective one or more processors such as the processors described above. One or more of these processors, as well as the other digital hardware, may be included in a single Application-Specific Integrated Circuitry (ASIC), or several processors and various digital hardware may be distributed among several separate components, whether individually packaged or assembled into a system-on-a-chip (SoC).

Some example Embodiments numbered 1-16 are described below. The following embodiments refer among other things to FIGS. 5, 6, 7, 8a-b, and 9a-b.

Embodiment 1. A method performed by a User Equipment, UE, 120 for handling a source radio link during a handover from a source access node 111 to a target access node 112 in a wireless communications network 100, the method comprising:

triggering 601 the UE 120 to perform the handover,
establishing 602 Radio Link Control, RLC, entities and associated target radio link with the target access node 112, while keeping RLC entities and associated source radio link with the source access node 111,
checking 603 whether a source link related failure, such as a source radio link related failure, has occurred,
when a source link related failure, such as a source radio link related failure, has occurred, checking 604 the radio link related failure against a set of source radio link release UE criteria, and
when one or more source radio link release UE criterion is fulfilled out of the set of source radio link release UE criteria, handling 605 the source radio link according to a predetermined rule.

Embodiment 2. The method according to embodiment 1, wherein the predetermined rule comprises any one or more out of:

release the radio link to the source access node 111 without sending an indication to the target access node 112,
release the radio link to the source access node 111 and send a message to the target access node 112 indicating that the UE 120 has released the radio connection to the source access node 111,
send a message to the target access node 104 indicating that one or more source radio link release UE criterion is fulfilled.

Embodiment 3. The method according to any of the embodiments 1-2, wherein the set of source radio link release UE criteria comprises any one or more out of:

the number of RLC entities associated with the source radio link for which the maximum RLC retransmission count has been reached, without positive feedback, is above a threshold,
the maximum RLC retransmission count has been reached, without positive feedback, for at least one RLC entity associated with the source radio link
the maximum RLC retransmission count has been reached, without positive feedback, for all RLC entities associated with the source radio link.
the number of Hybrid ARQ, HARQ, processes in the source access node 111 for which maximum number of retransmissions is reached is above a threshold,
one Hybrid ARQ, HARQ, process in the source access node 111 has reached the maximum number of retransmissions,
Radio Link Monitoring, RLM, performed by the source access node 111 on the source radio link triggers a radio link failure.

Embodiment 4. A computer program comprising instructions, which when executed by a processor, causes the processor to perform actions according to any of the embodiments 1-3.

Embodiment 5. A carrier comprising the computer program of embodiment 4, wherein the carrier is one of an electronic signal, an optical signal, an electromagnetic signal, a magnetic signal, an electric signal, a radio signal, a microwave signal, or a computer-readable storage medium.

Embodiment 6. A method performed by a source access node 111 for handling a source radio link during a handover of a User Equipment, UE, 120 from a source access node 111 to a target access node 112 in a wireless communications network 100, the method comprising:
  sending 702 to the UE 120, an instruction to perform the handover to the target access node 112, comprising establishing Radio Link Control, RLC, entities and associated target radio link with the target access node 112, while keeping RLC entities and associated source radio link with the source access node 111,
  checking 703 whether a source link related failure, such as a source radio link related failure, has occurred,
  when a source link related failure, such as a source radio link related failure, has occurred, checking 704 the radio link related failure against a set of source radio link release access node criteria, and
  when one or more source radio link release access node criterion is fulfilled out of the set of source radio link release access node, e.g. source access node, criteria, handling 705 the source radio link according to a predetermined rule.

Embodiment 7. The method according to embodiment 6, wherein the predetermined rule comprises any one or more out of:
  release the source radio link with the UE 120,
  keep the source radio link with the UE 120,
  send a message to the target access node 112 that the source radio link with the UE 102 has been released
  release the source radio link with the UE 120 and send an SN Status Transfer message to the target access node 112, and
  signal to the UE 120 that the source access node releases the source radio link.

Embodiment 8. The method according to any of the embodiments 1-2, wherein the set of source radio link release access node criteria comprises any one or more out of:
  the number of RLC entities associated with the UE 120 for which the maximum RLC retransmission count has been reached, without positive feedback, is above a threshold,
  the maximum RLC retransmission count has been reached, without positive feedback, for at least one RLC entity associated with the source radio link
  the maximum RLC retransmission count has been reached, without positive feedback, for all RLC entities associated with the source radio link,
  the number of Hybrid ARQ, HARQ, processes in the source access node 111 for which maximum number of retransmissions is reached is above a threshold,
  one Hybrid ARQ, HARQ, process in the source access node 111 has reached the maximum number of retransmissions,
  all Hybrid ARQ, HARQ, process in the source access node has reached the maximum number of retransmissions, and
  Radio Link Monitoring, RLM, performed by the source access node 111 on the source radio link triggers a radio link failure.

Embodiment 9. A computer program comprising instructions, which when executed by a processor, causes the processor to perform actions according to any of the embodiments 6-8.

Embodiment 10. A carrier comprising the computer program of embodiment 9, wherein the carrier is one of an electronic signal, an optical signal, an electromagnetic signal, a magnetic signal, an electric signal, a radio signal, a microwave signal, or a computer-readable storage medium.

Embodiment 11. A User Equipment, UE, 120 configured to handle a source radio link during a handover from a source access node 111 to a target access node 112 in a wireless communications network 100, the UE 120 further being configured to:
  trigger the UE 120 to perform the handover, e.g. by means of a triggering unit 801 in the UE 120,
  establish Radio Link Control, RLC, entities and associated target radio link with the target access node 112, while keeping RLC entities and associated source radio link with the source access node 111, e.g. by means of an establishing unit 802 in the UE 120,
  check whether a source link related failure, such as a source radio link related failure, has occurred, e.g. by means of a checking unit 803 in the UE 120,
  when a source link related failure, such as a source radio link related failure, has occurred, check the radio link related failure against a set of source radio link release UE criteria, e.g. by means of the checking unit 803 in the UE 120, and
  when one or more source radio link release UE criterion is fulfilled out of the set of source radio link release UE criteria, handle the source radio link according to a predetermined rule, e.g. by means of a handling unit 804 in the UE 120.

The UE (120) according to embodiment 11, wherein the predetermined rule is adapted to comprise release the radio link to the source access node 111.

Embodiment 12. The UE 120 according to embodiment 11, wherein the predetermined rule is adapted to comprise any one or more out of:
  release the radio link to the source access node 111 without sending an indication to the target access node 112,
  release the radio link to the source access node 111 and send a message to the target access node 112 adapted to indicate that the UE 120 has released the radio connection to the source access node 111,
  send a message to the target access node 112 adapted to indicate that one or more source radio link release UE criterion is fulfilled.

13. The UE 120 according to any of the embodiments 11-12, wherein the set of source radio link release UE criteria is adapted to comprise any one or more out of:
  the number of RLC entities associated with the source radio link for which the maximum RLC retransmission count has been reached, without positive feedback, is above a threshold,
  the maximum RLC retransmission count has been reached, without positive feedback, for at least one RLC entity associated with the source radio link
  the maximum RLC retransmission count has been reached, without positive feedback, for all RLC entities associated with the source radio link.
  the number of Hybrid ARQ, HARQ, processes in the source access node 111 for which maximum number of retransmissions is reached is above a threshold,
  one Hybrid ARQ, HARQ, process in the source access node 111 has reached the maximum number of retransmissions, Radio Link Monitoring, RLM, performed by the source access node 111 on the source radio link triggers a radio link failure.

The UE (120) according to any of the embodiments 11-13, further being configured to:

Upon a certain number of consecutive out-of-synchronization indications such as for the source radio link, start a timer, and if the timer expires, trigger a Radio Link Failure (RLF) condition. The timer may be represented by a T310.

Embodiment 14. A source access node 111 configured to handle a source radio link during a handover of a User Equipment, UE, 120 from a source access node 111 to a target access node 112 in a wireless communications network 100, the source access node 111 further being configured to:

send to the UE 120, an instruction to perform the handover to the target access node 112, adapted to comprise to establish Radio Link Control, RLC, entities and associated target radio link with the target access node 112, while keeping RLC entities and associated source radio link with the source access node 111, e.g. by means of a sending unit 901 in the source access node 111, check whether a source link related failure, such as a source radio link related failure, has occurred, e.g. by means of a checking unit 902 in the source access node 111, when a source link related failure, such as a source radio link related failure, has occurred, check the radio link related failure against a set of source radio link release access node criteria, e.g. by means of the checking unit 902 in the source access node 111, and when one or more source radio link release access node criterion is fulfilled out of the set of source radio link release access node, e.g. source access node, criteria, handle the source radio link according to a predetermined rule, e.g. by means of a handling unit 903 in the source access node 111.

The source access node (111) according to embodiment 14, wherein the predetermined rule comprises release the radio link to the source access node 111.

Embodiment 15. The source access node 111 according to embodiment 14, wherein the predetermined rule is adapted to comprise any one or more out of:

release the source radio link with the UE 120, keep the source radio link with the UE 120, send a message to the target access node 112 that the source radio link with the UE 102 has been released release the source radio link with the UE 120 and send an SN Status Transfer message to the target access node 112, and signal to the UE 120 that the source access node releases the source radio link.

Embodiment 16. The source access node 111 according to any of the embodiments 14-15, wherein the set of source radio link release access node criteria is adapted to comprise any one or more out of:

the number of RLC entities associated with the UE 120 for which the maximum RLC retransmission count has been reached, without positive feedback, is above a threshold, the maximum RLC retransmission count has been reached, without positive feedback, for at least one RLC entity associated with the source radio link the maximum RLC retransmission count has been reached, without positive feedback, for all RLC entities associated with the source radio link, the number of Hybrid ARQ, HARQ, processes in the source access node 111 for which maximum number of retransmissions is reached is above a threshold, one Hybrid ARQ, HARQ, process in the source access node 111 has reached the maximum number of retransmissions, all Hybrid ARQ, HARQ, process in the source access node has reached the maximum number of retransmissions, and Radio Link Monitoring, RLM, performed by the source access node 111 on the source radio link triggers a radio link failure.

Figure 10:
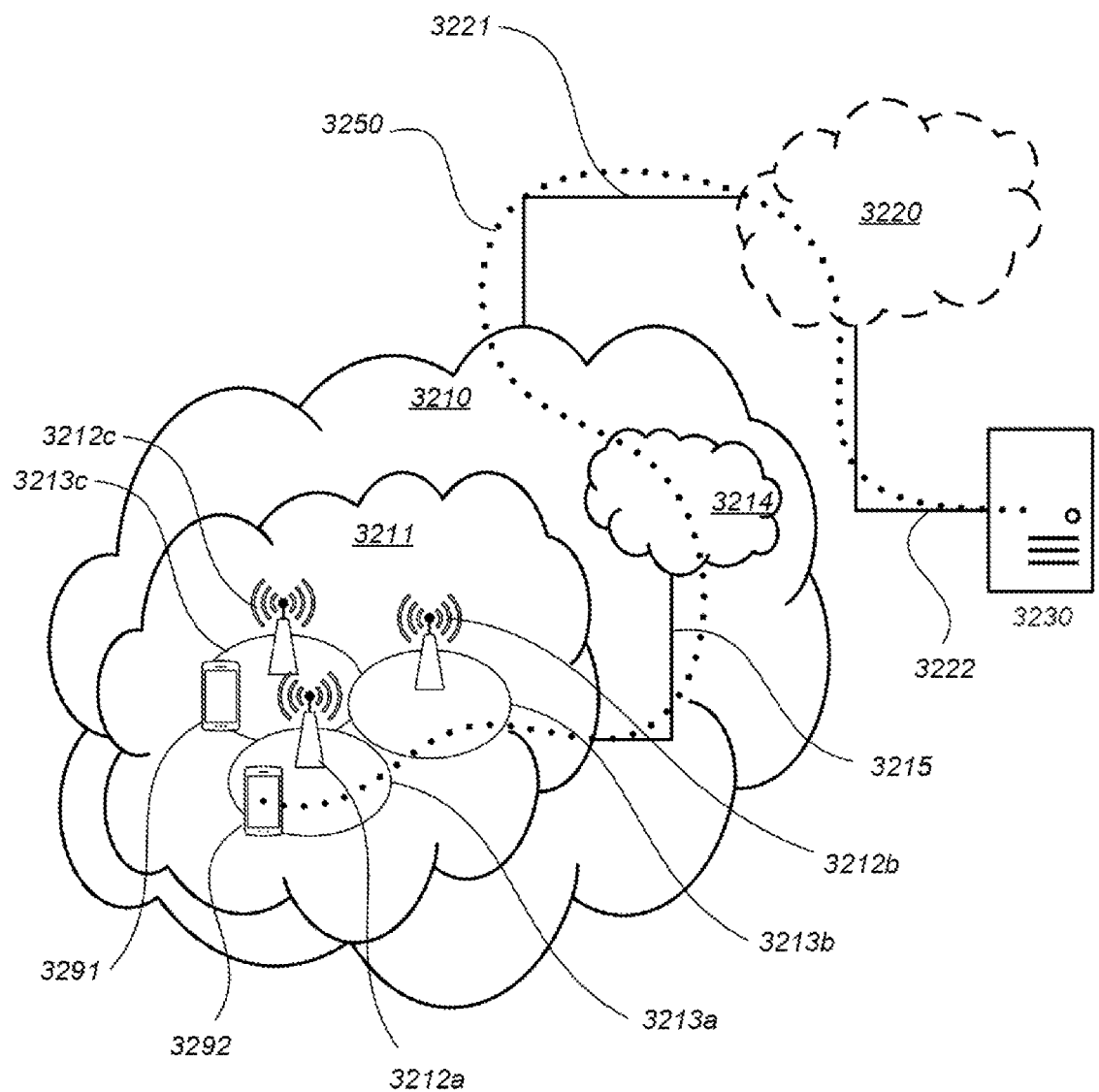
FIG. 10 schematically illustrates a telecommunication network connected via an intermediate network to a host computer.

With reference to FIG. 10, in accordance with an embodiment, a communication system includes a telecommunication network 3210, such as a 3GPP-type cellular network, which comprises an access network 3211, such as a radio access network, and a core network 3214. The access network 3211 comprises a plurality of base stations 3212*a*, 3212*b*, 3212*c*, such as the source and target access node 111, 112, AP STAs NBs, eNBs, gNBs or other types of wireless access points, each defining a corresponding coverage area 3213*a*, 3213*b*, 3213*c*. Each base station 3212*a*, 3212*b*, 3212*c* is connectable to the core network 3214 over a wired or wireless connection 3215. A first user equipment (UE) such as a Non-AP STA 3291 located in coverage area 3213*c* is configured to wirelessly connect to, or be paged by, the corresponding base station 3212*c*. A second UE 3292 such as a Non-AP STA in coverage area 3213*a* is wirelessly connectable to the corresponding base station 3212*a*. While a plurality of UEs 3291, 3292 are illustrated in this example, the disclosed embodiments are equally applicable to a situation where a sole UE is in the coverage area or where a sole UE is connecting to the corresponding base station 3212.

The telecommunication network 3210 is itself connected to a host computer 3230, which may be embodied in the hardware and/or software of a standalone server, a cloud-implemented server, a distributed server or as processing resources in a server farm. The host computer 3230 may be under the ownership or control of a service provider, or may be operated by the service provider or on behalf of the service provider. The connections 3221, 3222 between the telecommunication network 3210 and the host computer 3230 may extend directly from the core network 3214 to the host computer 3230 or may go via an optional intermediate network 3220. The intermediate network 3220 may be one of, or a combination of more than one of, a public, private or hosted network; the intermediate network 3220, if any, may be a backbone network or the Internet; in particular, the intermediate network 3220 may comprise two or more sub-networks (not shown).

The communication system of FIG. 10 as a whole enables connectivity between one of the connected UEs 3291, 3292 such as e.g. the UE 120, and the host computer 3230. The connectivity may be described as an over-the-top (OTT) connection 3250. The host computer 3230 and the connected UEs 3291, 3292 are configured to communicate data and/or signaling via the OTT connection 3250, using the access network 3211, the core network 3214, any intermediate network 3220 and possible further infrastructure (not shown) as intermediaries. The OTT connection 3250 may be transparent in the sense that the participating communication devices through which the OTT connection 3250 passes are unaware of routing of uplink and downlink communications. For example, a base station 3212 may not or need not be informed about the past routing of an incoming downlink communication with data originating from a host computer 3230 to be forwarded (e.g., handed over) to a connected UE 3291. Similarly, the base station 3212 need not be aware of the future routing of an outgoing uplink communication originating from the UE 3291 towards the host computer 3230. Example implementations, in accordance with an embodiment, of the UE, base station and host computer discussed in the preceding paragraphs will now be described with reference to FIG. 11. In a communication system 3300, a host computer 3310 comprises hardware 3315 including a communication interface 3316 configured to set up and maintain a wired or wireless connection with an interface of a different communication device of the communication system 3300. The host computer 3310 further comprises processing circuitry 3318, which may have storage and/or processing capabilities. In particular, the processing circuitry 3318 may comprise one or more programmable processors, application-specific integrated circuits, field programmable gate arrays or combinations of these (not shown) adapted to execute instructions. The host computer 3310 further comprises software 3311, which is stored in or accessible by the host computer 3310 and executable by the processing circuitry 3318. The software 3311 includes a host application 3312. The host application 3312 may be operable to provide a service to a remote user, such as a UE 3330 connecting via an OTT connection 3350 terminating at the UE 3330 and the host computer 3310. In providing the service to the remote user, the host application 3312 may provide user data which is transmitted using the OTT connection 3350.

The communication system 3300 further includes a base station 3320 provided in a telecommunication system and comprising hardware 3325 enabling it to communicate with the host computer 3310 and with the UE 3330. The hardware 3325 may include a communication interface 3326 for setting up and maintaining a wired or wireless connection with an interface of a different communication device of the communication system 3300, as well as a radio interface 3327 for setting up and maintaining at least a wireless connection 3370 with a UE 3330 located in a coverage area (not shown in FIG. 11) served by the base station 3320. The communication interface 3326 may be configured to facilitate a connection 3360 to the host computer 3310. The connection 3360 may be direct or it may pass through a core network (not shown in FIG. 11) of the telecommunication system and/or through one or more intermediate networks outside the telecommunication system. In the embodiment shown, the hardware 3325 of the base station 3320 further includes processing circuitry 3328, which may comprise one or more programmable processors, application-specific integrated circuits, field programmable gate arrays or combinations of these (not shown) adapted to execute instructions. The base station 3320 further has software 3321 stored internally or accessible via an external connection.

The communication system 3300 further includes the UE 3330 already referred to. Its hardware 3335 may include a radio interface 3337 configured to set up and maintain a wireless connection 3370 with a base station serving a coverage area in which the UE 3330 is currently located. The hardware 3335 of the UE 3330 further includes processing circuitry 3338, which may comprise one or more programmable processors, application-specific integrated circuits, field programmable gate arrays or combinations of these (not shown) adapted to execute instructions. The UE 3330 further comprises software 3331, which is stored in or accessible by the UE 3330 and executable by the processing circuitry 3338. The software 3331 includes a client application 3332. The client application 3332 may be operable to provide a service to a human or non-human user via the UE 3330, with the support of the host computer 3310. In the host computer 3310, an executing host application 3312 may communicate with the executing client application 3332 via the OTT connection 3350 terminating at the UE 3330 and the host computer 3310. In providing the service to the user, the client application 3332 may receive request data from the host application 3312 and provide user data in response to the request data. The OTT connection 3350 may transfer both the request data and the user data. The client application 3332 may interact with the user to generate the user data that it provides. It is noted that the host computer 3310, base station 3320 and UE 3330 illustrated in FIG. 11 may be identical to the host computer 3230, one of the base stations 3212a, 3212b, 3212c and one of the UEs 3291, 3292 of FIG. 10, respectively. This is to say, the inner workings of these entities may be as shown in FIG. 11 and independently, the surrounding network topology may be that of FIG. 10.

Figure 11:
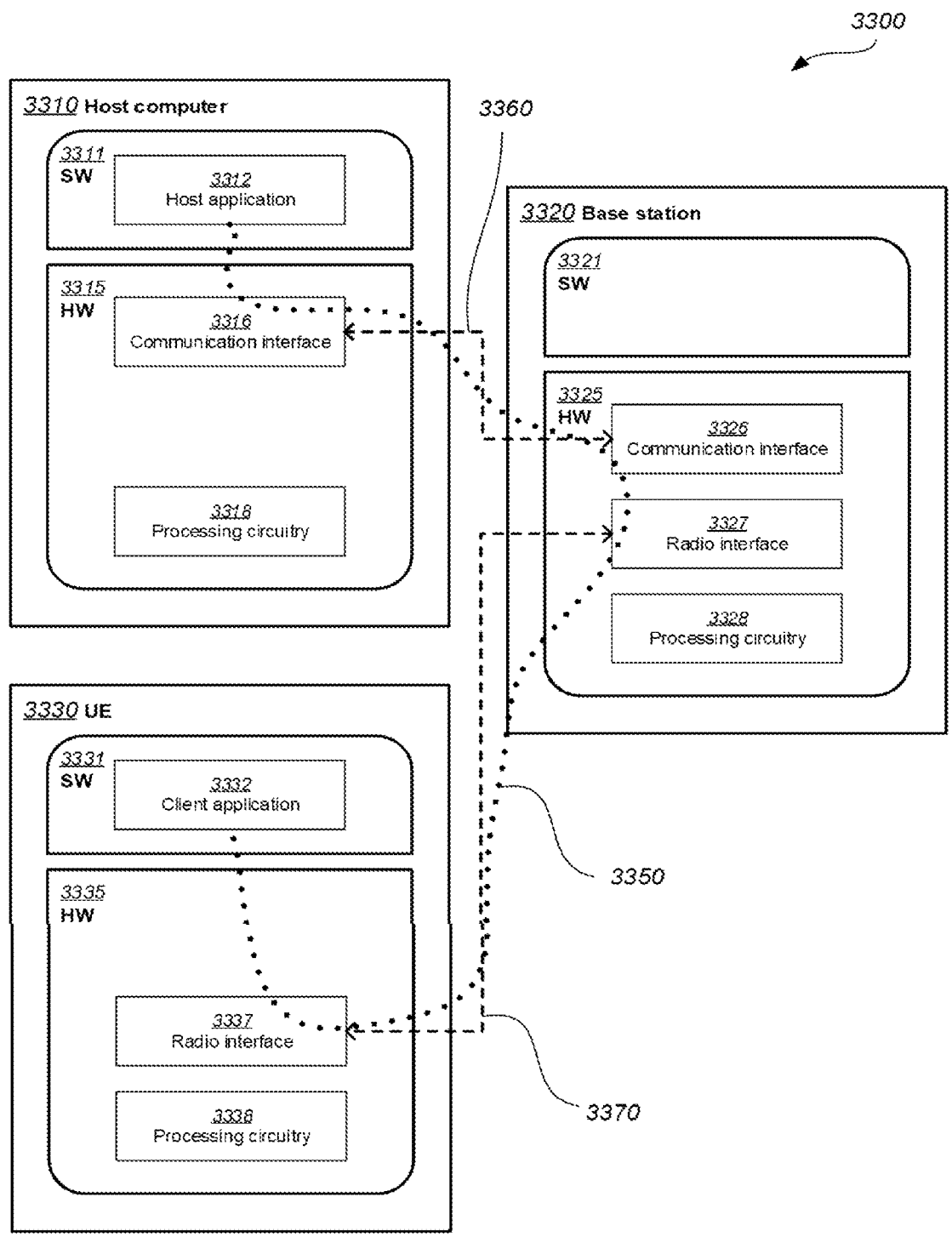
FIG. 11 is a generalized block diagram of a host computer communicating via a base station with a user equipment over a partially wireless connection.

In FIG. 11, the OTT connection 3350 has been drawn abstractly to illustrate the communication between the host computer 3310 and the use equipment 3330 via the base station 3320, without explicit reference to any intermediary devices and the precise routing of messages via these devices. Network infrastructure may determine the routing, which it may be configured to hide from the UE 3330 or from the service provider operating the host computer 3310, or both. While the OTT connection 3350 is active, the network infrastructure may further take decisions by which it dynamically changes the routing (e.g., on the basis of load balancing consideration or reconfiguration of the network).

The wireless connection 3370 between the UE 3330 and the base station 3320 is in accordance with the teachings of the embodiments described throughout this disclosure. One or more of the various embodiments improve the performance of OTT services provided to the UE 3330 using the OTT connection 3350, in which the wireless connection 3370 forms the last segment. More precisely, the teachings of these embodiments may improve the data rate, latency, power consumption and thereby provide benefits such as reduced user waiting time, relaxed restriction on file size, better responsiveness, extended battery lifetime.

A measurement procedure may be provided for the purpose of monitoring data rate, latency and other factors on which the one or more embodiments improve. There may further be an optional network functionality for reconfiguring the OTT connection 3350 between the host computer 3310 and UE 3330, in response to variations in the measurement results. The measurement procedure and/or the network functionality for reconfiguring the OTT connection 3350 may be implemented in the software 3311 of the host computer 3310 or in the software 3331 of the UE 3330, or both. In embodiments, sensors (not shown) may be deployed in or in association with communication devices through which the OTT connection 3350 passes; the sensors may participate in the measurement procedure by supplying values of the monitored quantities exemplified above, or supplying values of other physical quantities from which software 3311, 3331 may compute or estimate the monitored quantities. The reconfiguring of the OTT connection 3350 may include message format, retransmission settings, preferred routing etc.; the reconfiguring need not affect the base station 3320, and it may be unknown or imperceptible to the base station 3320. Such procedures and functionalities may be known and practiced in the art. In certain embodiments, measurements may involve proprietary UE signaling facilitating the host computer's 3310 measurements of throughput, propagation times, latency and the like. The measurements may be implemented in that the software 3311, 3331 causes messages to be transmitted, in particular empty or 'dummy' messages, using the OTT connection 3350 while it monitors propagation times, errors etc.

Figures 12, 13:
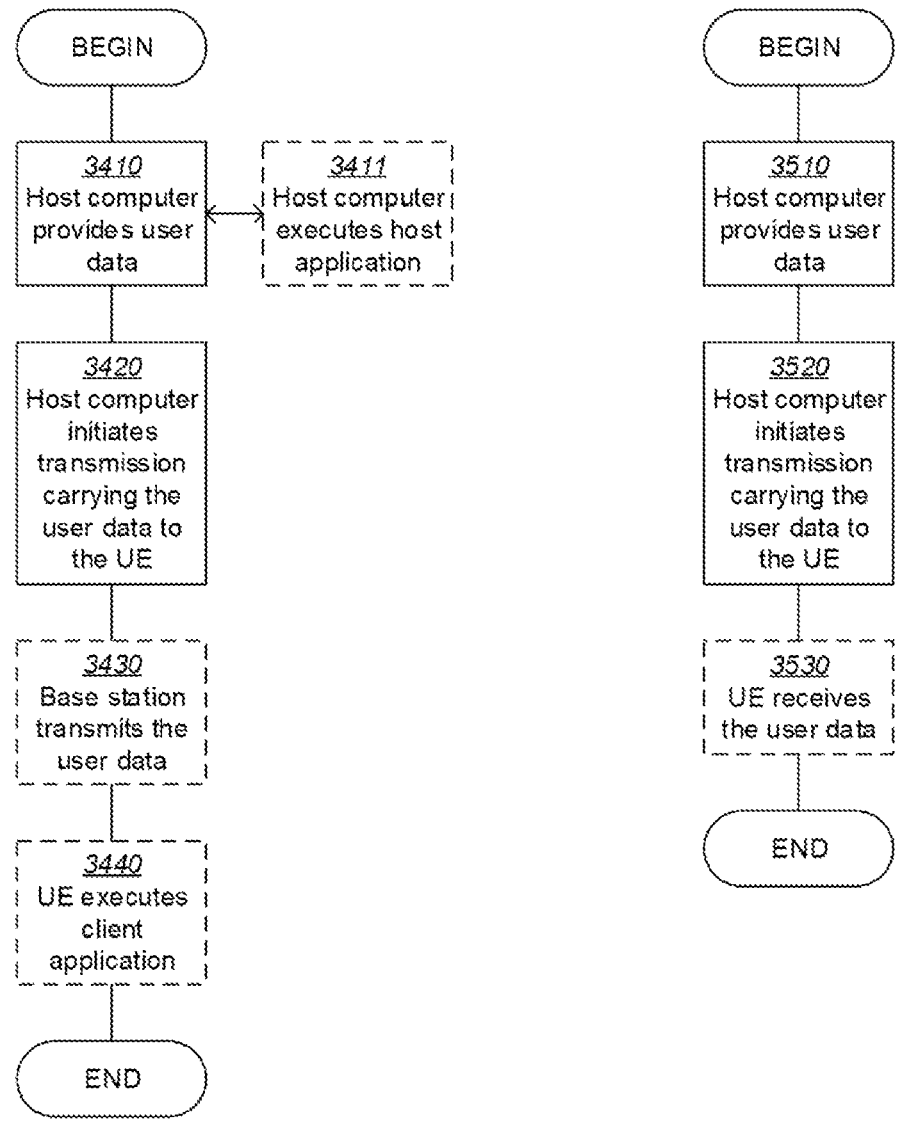
FIGS. 12-15 are flowcharts illustrating methods implemented in a communication system including a host computer, a base station and a user equipment.

FIG. 12 is a flowchart illustrating a method implemented in a communication system, in accordance with one embodiment. The communication system includes a host computer, a base station such as a AP STA, and a UE such as a Non-AP STA which may be those described with reference to FIG. 10 and FIG. 11. For simplicity of the present disclosure, only drawing references to FIG. 12 will be included in this section. In a first action 3410 of the method, the host computer provides user data. In an optional subaction 3411 of the first action 3410, the host computer provides the user data by executing a host application. In a second action 3420, the host computer initiates a transmission carrying the user data to the UE. In an optional third action 3430, the base station transmits to the UE the user data which was carried in the transmission that the host computer initiated, in accordance with the teachings of the embodiments described throughout this disclosure. In an optional fourth action 3440, the UE executes a client application associated with the host application executed by the host computer.

FIG. 13 is a flowchart illustrating a method implemented in a communication system, in accordance with one embodiment. The communication system includes a host computer, a base station such as a AP STA, and a UE such as a Non-AP STA which may be those described with reference to FIG. 10 and FIG. 11. For simplicity of the present disclosure, only drawing references to FIG. 13 will be included in this section. In a first action 3510 of the method, the host computer provides user data. In an optional subaction (not shown) the host computer provides the user data by executing a host application. In a second action 3520, the host computer initiates a transmission carrying the user data to the UE. The transmission may pass via the base station, in accordance with the teachings of the embodiments described throughout this disclosure. In an optional third action 3530, the UE receives the user data carried in the transmission.

Figures 14, 15:
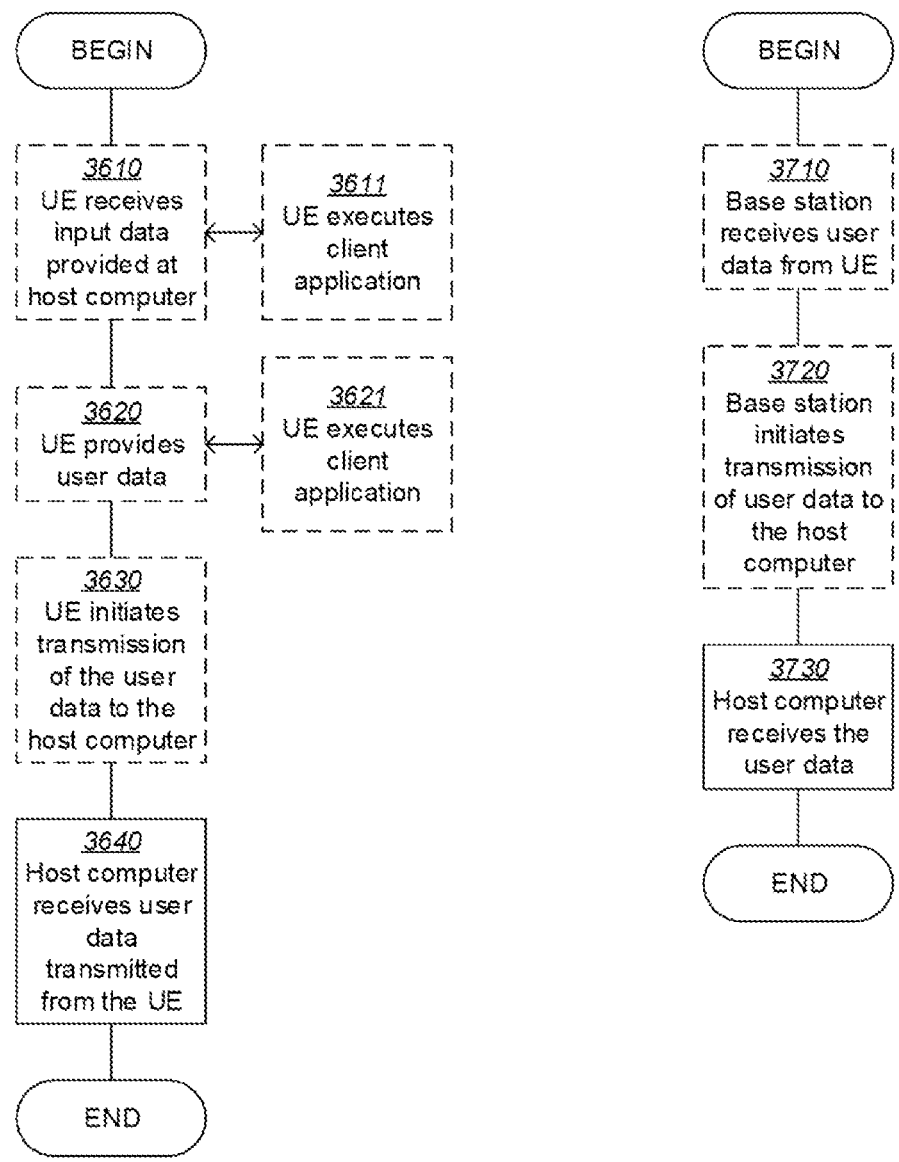

FIG. 14 is a flowchart illustrating a method implemented in a communication system, in accordance with one embodiment. The communication system includes a host computer, a base station such as a AP STA, and a UE such as a Non-AP STA which may be those described with reference to FIG. 10 and FIG. 11. For simplicity of the present disclosure, only drawing references to FIG. 14 will be included in this section. In an optional first action 3610 of the method, the UE receives input data provided by the host computer. Additionally or alternatively, in an optional second action 3620, the UE provides user data. In an optional subaction 3621 of the second action 3620, the UE provides the user data by executing a client application. In a further optional subaction 3611 of the first action 3610, the UE executes a client application which provides the user data in reaction to the received input data provided by the host computer. In providing the user data, the executed client application may further consider user input received from the user. Regardless of the specific manner in which the user data was provided, the UE initiates, in an optional third subaction 3630, transmission of the user data to the host computer. In a fourth action 3640 of the method, the host computer receives the user data transmitted from the UE, in accordance with the teachings of the embodiments described throughout this disclosure.

FIG. 15 is a flowchart illustrating a method implemented in a communication system, in accordance with one embodiment. The communication system includes a host computer, a base station such as a AP STA, and a UE such as a Non-AP STA which may be those described with reference to FIGS. 32 and 33. For simplicity of the present disclosure, only drawing references to FIG. 15 will be included in this section. In an optional first action 3710 of the method, in accordance with the teachings of the embodiments described throughout this disclosure, the base station receives user data from the UE. In an optional second action 3720, the base station initiates transmission of the received user data to the host computer. In a third action 3730, the host computer receives the user data carried in the transmission initiated by the base station.

When using the word "comprise" or "comprising" it shall be interpreted as non-limiting, i.e. meaning "consist at least of".

The embodiments herein are not limited to the above described preferred embodiments. Various alternatives, modifications and equivalents may be used.

Abbreviations

| Abbreviation | Explanation |
| --- | --- |
| 3GPP | 3rd Generation Partnership Project |
| 5G | 5th Generation |
| 5GS | 5G System |
| 5GC | 5G Core network |
| AM | Acknowledged Mode |
| AMD | Acknowledged Mode Data |
| AMF | Access and Mobility Management Function |
| ARQ | Automated Repeat Request |
| CHO | Conditional Handover |
| CN | Core Network |
| C-RNTI | Cell RNTI |
| CU | Central Unit |
| DL | Downlink |
| DU | Distributed Unit |
| eICIC | Enhanced Inter-Cell Interference Coordination |
| eNB | Evolved Node B |
| eMBB | Enhanced Make-Before-Break |
| E-UTRAN | Evolved Universal Terrestrial Access Network |
| EPC | Evolved Packet Core network |
| gNB | 5G Node B |
| HARQ | Hybrid Automatic Repeat Request |
| HO | Handover |
| ICIC | Inter-Cell Interference Coordination |

| Abbreviation | Explanation |
| --- | --- |
| LTE | Long-term Evolution |
| MAC | Medium Access Control |
| MBB | Make-Before-Break |
| MME | Mobility Management Entity |
| NCC | Next Hop Chaining Counter |
| NG | The interface/reference point between the RAN and the CN in 5G/NR. |
| NG-C | The control plane part of NG (between a gNB and an AMF). |
| NG-U | The user plane part of NG (between a gNB and a UPF). |
| NG-RAN | Next Generation Radio Access Network |
| NR | New Radio |
| PDCP | Packet Data Convergence Protocol |
| PDU | Protocol Data Unit |
| PHY | Physical layer |
| QoS | Quality of Service |
| RA | Random Access |
| RACH | Random Access Channel |
| RAN | Radio Access Network |
| RAR | Random Access Response |
| RLC | Radio Link Control |
| RLM | Radio Link Monitoring |
| ROHC | Robust Header Compression |
| RNTI | Radio Network Temporary Identifier |
| RRC | Radio Resource Control |
| Rx | Receive |
| S1 | The interface/reference point between the RAN and the CN in LTE. |
| S1-C | The control plane part of S1 (between an eNB and a MME). |
| S1-U | The user plane part of S1 (between an eNB and a SGW). |
| SDU | Service Data Unit |
| SGW | Serving Gateway |
| SN | Sequence Number |
| TS | Technical Specification |
| Tx | Transmit |
| UCI | Uplink Control Information |
| UE | User Equipment |
| UL | Uplink |
| UPF | User Plane Function |
| URLLC | Ultra-Reliable Low-Latency Communication |
| X2 | The interface/reference point between two eNBs. |
| X2AP | X2 Application Protocol |
| Xn | The interface/reference point between two gNBs. |
| XnAP | Xn Application Protocol |

The invention claimed is:

1. A method performed by a User Equipment, UE for handling a source radio link during a handover from a source access node to a target access node in a wireless communications network, the method comprising:
triggering the UE to perform the handover,
establishing Radio Link Control, RLC, entities and associated target radio link with the target access node, while keeping RLC entities and associated source radio link with the source access node,
checking whether a source radio link related failure has occurred,
when a source radio link related failure has occurred, checking the radio link related failure against a set of source radio link release UE criteria,
when one or more source radio link release UE criterion is fulfilled out of the set of source radio link release UE criteria, handling the source radio link according to a predetermined rule, the predetermined rule comprising one or more predetermined actions associated with the one or more fulfilled source radio link release UE criterion,
when the one or more predetermined actions associated with the one or more fulfilled source radio link release UE criterion are combinable, performing all of the one or more predetermined actions, and
when the one or more predetermined actions associated with the one or more fulfilled source radio link release UE criterion are non-combinable, performing the one or more combinable predetermined actions associated with the highest number of fulfilled source radio link release UE criterion or performing the one or more combinable predetermined actions associated with the one or more fulfilled source radio link release UE criterion with the highest priority.

2. The method according to claim 1, wherein the predetermined rule comprises release the radio link to the source access node.

3. The method according to claim 1, wherein the predetermined rule comprises any one or more out of:
release the radio link to the source access node without sending an indication to the target access node,
release the radio link to the source access node and send a message to the target access node indicating that the UE has released the radio connection to the source access node,
send a message to the target access node indicating that one or more source radio link release UE criterion is fulfilled.

4. The method according to claim 1, wherein the set of source radio link release UE criteria comprises any one or more out of:
the number of RLC entities associated with the source radio link for which the maximum RLC retransmission count has been reached, without positive feedback, is above a threshold, the maximum RLC retransmission count has been reached, without positive feedback, for at least one RLC entity associated with the source radio link, the maximum RLC retransmission count has been reached, without positive feedback, for all RLC entities associated with the source radio link, the number of Hybrid ARQ, HARQ, processes in the source access node for which maximum number of retransmissions is reached is above a threshold, one Hybrid ARQ, HARQ, process in the source access node has reached the maximum number of retransmissions, Radio Link Monitoring, RLM, performed by the source access node on the source radio link triggers a radio link failure.

5. The method according to claim 1, further comprising:
upon a certain number of consecutive out-of-synchronization indications starting a timer, and
if the timer expires, triggering a Radio Link Failure (RLF) condition.

6. The method according to claim 5, wherein the timer is represented by a T310.

7. A method performed by a source access node for handling a source radio link during a handover of a User Equipment, UE, from a source access node to a target access node in a wireless communications network, the method comprising:
sending to the UE, an instruction to perform the handover to the target access node, comprising establishing Radio Link Control, RLC, entities and associated target radio link with the target access node, while keeping RLC entities and associated source radio link with the source access node,
checking whether a source radio link related failure has occurred,
when a source radio link related failure has occurred, checking the radio link related failure against a set of source radio link release access node criteria, and
when one or more source radio link release access node criterion is fulfilled out of the set of source radio link release access node criteria, handling the source radio link according to a predetermined rule, the predetermined rule comprising one or more predetermined actions associated with the one or more fulfilled source radio link release UE criterion,
when the one or more predetermined actions associated with the one or more fulfilled source radio link release UE criterion are combinable, performing all of the one or more predetermined actions, and
when the one or more predetermined actions associated with the one or more fulfilled source radio link release UE criterion are non-combinable, performing the one or more combinable predetermined actions associated with the highest number of fulfilled source radio link release UE criterion or performing the one or more combinable predetermined actions associated with the one or more fulfilled source radio link release UE criterion with the highest priority.

8. The method according to claim 7, wherein the predetermined rule comprises release the radio link to the source access node.

9. The method according to claim 7, wherein the predetermined rule comprises any one or more out of:
release the source radio link with the UE,
keep the source radio link with the UE,
send a message to the target access node that the source radio link with the UE has been released,
release the source radio link with the UE and send an SN Status Transfer message to the target access node, and
signal to the UE that the source access node releases the source radio link.

10. The method according to claim 7, wherein the set of source radio link release access node criteria comprises any one or more out of:
the number of RLC entities associated with the UE for which the maximum RLC retransmission count has been reached, without positive feedback, is above a threshold,
the maximum RLC retransmission count has been reached, without positive feedback, for at least one RLC entity associated with the source radio link
the maximum RLC retransmission count has been reached, without positive feedback, for all RLC entities associated with the source radio link,
the number of Hybrid ARQ, HARQ, processes in the source access node for which maximum number of retransmissions is reached is above a threshold,
one Hybrid ARQ, HARQ, process in the source access node has reached the maximum number of retransmissions,
all Hybrid ARQ, HARQ, process in the source access node has reached the maximum number of retransmissions, and
Radio Link Monitoring, RLM, performed by the source access node on the source radio link triggers a radio link failure.

11. A User Equipment, UE, configured to handle a source radio link during a handover from a source access node to a target access node in a wireless communications network, the UE comprising processing circuitry configured to:
trigger the UE to perform the handover,
establish Radio Link Control, RLC, entities and associated target radio link with the target access node, while keeping RLC entities and associated source radio link with the source access node,
check whether a source radio link related failure has occurred,
when a source radio link related failure has occurred, check the radio link related failure against a set of source radio link release UE criteria, and
when one or more source radio link release UE criterion is fulfilled out of the set of source radio link release UE criteria, handle the source radio link according to a predetermined rule, the predetermined rule comprising one or more predetermined actions associated with the one or more fulfilled source radio link release UE criterion,
when the one or more predetermined actions associated with the one or more fulfilled source radio link release UE criterion are combinable, performing all of the one or more predetermined actions, and
when the one or more predetermined actions associated with the one or more fulfilled source radio link release UE criterion are non-combinable, performing the one or more combinable predetermined actions associated with the highest number of fulfilled source radio link release UE criterion or performing the one or more combinable predetermined actions associated with the one or more fulfilled source radio link release UE criterion with the highest priority.

12. The UE according to claim 11, wherein the predetermined rule comprises release the radio link to the source access node.

13. The UE according to claim 11, wherein the predetermined rule comprises any one or more out of:
- release the radio link to the source access node without sending an indication to the target access node,
- release the radio link to the source access node and send a message to the target access node to indicate that the UE has released the radio connection to the source access node,
- send a message to the target access node to indicate that one or more source radio link release UE criterion is fulfilled.

14. The UE according to claim 11, wherein the set of source radio link release UE criteria comprises any one or more out of:
- the number of RLC entities associated with the source radio link for which the maximum RLC retransmission count has been reached, without positive feedback, is above a threshold,
- the maximum RLC retransmission count has been reached, without positive feedback, for at least one RLC entity associated with the source radio link
- the maximum RLC retransmission count has been reached, without positive feedback, for all RLC entities associated with the source radio link,
- the number of Hybrid ARQ, HARQ, processes in the source access node for which maximum number of retransmissions is reached is above a threshold,
- one Hybrid ARQ, HARQ, process in the source access node has reached the maximum number of retransmissions,
- Radio Link Monitoring, RLM, performed by the source access node on the source radio link triggers a radio link failure.

15. The UE according to claim 11, the processing circuitry further being configured to:
- upon a certain number of consecutive out-of-synchronization indications, start a timer, and
- if the timer expires, trigger a Radio Link Failure (RLF) condition.

16. The UE according to claim 15, wherein the timer is represented by a T310.

17. A source access node configured to handle a source radio link during a handover of a User Equipment, UE, from a source access node to a target access node in a wireless communications network, the source access node comprising processing circuitry configured to:
- send to the UE an instruction to perform the handover to the target access node to establish Radio Link Control, RLC, entities and associated target radio link with the target access node, while keeping RLC entities and associated source radio link with the source access node,
- check whether a source radio link related failure has occurred,
- when a source radio link related failure has occurred, check the radio link related failure against a set of source radio link release access node criteria, and
- when one or more source radio link release access node criterion is fulfilled out of the set of source radio link release access node criteria, handle the source radio link according to a predetermined rule, the predetermined rule comprising one or more predetermined actions associated with the one or more fulfilled source radio link release UE criterion,
- when the one or more predetermined actions associated with the one or more fulfilled source radio link release UE criterion are combinable, performing all of the one or more predetermined actions, and
- when the one or more predetermined actions associated with the one or more fulfilled source radio link release UE criterion are non-combinable, performing the one or more combinable predetermined actions associated with the highest number of fulfilled source radio link release UE criterion or performing the one or more combinable predetermined actions associated with the one or more fulfilled source radio link release UE criterion with the highest priority.

18. The source access node according to claim 17, wherein the predetermined rule comprises release the radio link to the source access node.

19. The source access node according to claim 17, wherein the predetermined rule comprises any one or more out of:
- release the source radio link with the UE,
- keep the source radio link with the UE,
- send a message to the target access node that the source radio link with the UE has been released
- release the source radio link with the UE and send an SN Status Transfer message to the target access node, and
- signal to the UE that the source access node releases the source radio link.

20. The source access node according to claim 17, wherein the set of source radio link release access node criteria comprises any one or more out of:
- the number of RLC entities associated with the UE for which the maximum RLC retransmission count has been reached, without positive feedback, is above a threshold,
- the maximum RLC retransmission count has been reached, without positive feedback, for at least one RLC entity associated with the source radio link
- the maximum RLC retransmission count has been reached, without positive feedback, for all RLC entities associated with the source radio link,
- the number of Hybrid ARQ, HARQ, processes in the source access node for which maximum number of retransmissions is reached is above a threshold,
- one Hybrid ARQ, HARQ, process in the source access node has reached the maximum number of retransmissions,
- all Hybrid ARQ, HARQ, process in the source access node has reached the maximum number of retransmissions, and
- Radio Link Monitoring, RLM, performed by the source access node on the source radio link triggers a radio link failure.

* * * * *